(12) United States Patent
Cumbo

(10) Patent No.: US 11,220,853 B2
(45) Date of Patent: Jan. 11, 2022

(54) DOOR PRESENTER WITH TOOTHED CLUTCH

(71) Applicant: Magna Closures Inc., Newmarket (CA)

(72) Inventor: Francesco Cumbo, Pisa (IT)

(73) Assignee: MAGNA CLOSURES, INC., Newmarket (CA)

(*) Notice: Subject to any disclaimer, the term of this patent is extended or adjusted under 35 U.S.C. 154(b) by 19 days.

(21) Appl. No.: 16/799,228

(22) Filed: Feb. 24, 2020

(65) Prior Publication Data
US 2020/0270928 A1    Aug. 27, 2020

Related U.S. Application Data

(60) Provisional application No. 62/809,958, filed on Feb. 25, 2019.

(51) Int. Cl.
*E05F 15/00* (2015.01)
*E05F 15/41* (2015.01)
*E05F 15/611* (2015.01)
*F16H 25/20* (2006.01)

(52) U.S. Cl.
CPC ............ *E05F 15/41* (2015.01); *E05F 15/611* (2015.01); *E05Y 2201/216* (2013.01); *E05Y 2201/696* (2013.01); *E05Y 2900/531* (2013.01); *F16H 2025/2071* (2013.01)

(58) Field of Classification Search
CPC ....... E05F 15/614; E05F 15/63; E05F 15/616; E05F 15/41; E05F 15/611; E05F 15/622; F16H 2025/2071; E05Y 2201/426; E05Y 2201/216; E05Y 2900/531; E05Y 2201/696; E05Y 2900/546; E05Y 2800/11;
(Continued)

(56) References Cited

U.S. PATENT DOCUMENTS

| | | | |
|---|---|---|---|
| 6,094,867 A * | 8/2000 | Reddy | B61D 19/02 49/280 |
| 7,938,473 B2 * | 5/2011 | Paton | E05F 15/622 296/146.8 |
| 9,353,566 B2 | 5/2016 | Miu et al. | |

(Continued)

FOREIGN PATENT DOCUMENTS

| CN | 1891963 A | 1/2007 |
|---|---|---|
| CN | 201381734 Y | 1/2010 |

(Continued)

*Primary Examiner* — Chi Q Nguyen
(74) *Attorney, Agent, or Firm* — Dickinson Wright PLLC

(57) ABSTRACT

A door presenter with a toothed clutch includes an extensible member that is controllable by a motor. The extensible member is driven by a lead screw, which is rotated by the motor via the toothed clutch to translate the extensible member. The toothed clutch includes a coupling disk and a coupling lever. The coupling disk is rotationally fixed to the lead screw, and the coupling lever is rotationally fixed to a drive gear driven by the motor. An axial load applied to the extensible member toward the toothed clutch causes rotation of the lead screw and coupling disk when the load exceeds a clutch disengagement threshold. The clutch will reengage after further relative rotation of the coupling disk and the coupling lever, which may occur in response to rotation of the lead screw or rotation of the coupling lever caused by actuation of the motor.

14 Claims, 22 Drawing Sheets

(58) Field of Classification Search
CPC ............... B60J 5/047; Y10T 74/18568; Y10T 74/18696
USPC ................. 49/28, 27, 26, 138, 280, 340
See application file for complete search history.

(56) References Cited

U.S. PATENT DOCUMENTS

| | | |
|---|---|---|
| 9,976,332 B2 | 5/2018 | Scheuring et al. |
| 10,370,886 B2 | 8/2019 | Scheuring et al. |
| 11,008,780 B2* | 5/2021 | Oxley .................... E05B 81/20 |
| 2008/0271552 A1 | 11/2008 | Arenz et al. |
| 2009/0200830 A1* | 8/2009 | Paton ....................... B60J 5/101 296/146.8 |
| 2017/0292310 A1* | 10/2017 | Podkopayev ......... E05F 15/622 |
| 2017/0292311 A1 | 10/2017 | Podkopayev |
| 2018/0223583 A1* | 8/2018 | Podkopayev ............. F16D 3/46 |
| 2018/0258682 A1 | 9/2018 | Schatz et al. |
| 2019/0024421 A1* | 1/2019 | Gumbo ................... E05F 15/73 |
| 2019/0112859 A1 | 4/2019 | Cumbo |
| 2019/0145148 A1* | 5/2019 | Klingbeil .................. B60J 5/06 49/280 |
| 2019/0153768 A1* | 5/2019 | Termine ................ E05F 15/622 |
| 2019/0211605 A1* | 7/2019 | Scheuring ............. E05F 15/622 |
| 2019/0277071 A1* | 9/2019 | Sabatini ................. B60Q 1/323 |
| 2019/0292818 A1* | 9/2019 | Gumbo ................... E05B 81/14 |
| 2019/0368237 A1 | 12/2019 | Distefano et al. |
| 2020/0232262 A1* | 7/2020 | Marlia .................... B60R 25/34 |

FOREIGN PATENT DOCUMENTS

| | | |
|---|---|---|
| CN | 104832033 A | 8/2015 |
| CN | 107386862 A | 11/2017 |
| CN | 108240146 A | 7/2018 |
| DE | 102008005229 B4 | 7/2009 |

* cited by examiner

DOOR PRESENTER WITH TOOTHED CLUTCH

CROSS-REFERENCE TO RELATED APPLICATIONS

This application claims the benefit of U.S. Provisional Patent Application No. 62/809,958, filed Feb. 25, 2019, titled "Door Presenter with Toothed Clutch," the entire content of which is hereby incorporated by reference in its entirety herein.

FIELD

The present disclosure relates generally to power door systems for motor vehicles. More particularly, the present disclosure is directed to a power door actuation system equipped with a power door presenter operable for powered movement of a vehicle door relative to a vehicle body between a closed position and an open position, with the door presenter including a clutch for overload protection.

BACKGROUND

This section provides background information related to the present disclosure which is not necessarily prior art.

In view of increased consumer demand for motor vehicles equipped with advanced comfort and convenience features, many current vehicles are now provided with passive keyless entry systems to permit locking and release of the passenger doors without the use of traditional key-type manual entry systems. As a further advancement, power door actuation systems have been developed which function to automatically swing the passenger door about its pivot axis between its open and closed positions without any manual intervention with the door by a user. As a result, vehicle manufacturers are foregoing the integration of traditional door handles on the exterior of the vehicle door resulting in cost and weight savings, as well as styling and aerodynamic benefits. In lieu, such door handles are being replaced with wireless key fobs and/or electronic sensors i.e. touch/touchless sensors. For example, a capacitive touch pad may be provided to replace an external handle or unlock switch which is in communication with an electronic latch to command the unlock of the latch and the operation of the power door actuation system(s) to open the door.

Typically, such power door actuation systems include a power-operated device such as, for example, a power swing door actuator having an electric motor and a rotary-to-linear conversion device that are operable for converting the rotary output of the electric motor into translational movement of an extensible member. In many power door actuator arrangements, the power swing door actuator is mounted to the passenger door and the distal end of the extensible member is fixedly secured to the vehicle body. One example of a door-mounted power door actuation system is shown in commonly-owned U.S. Pat. No. 9,174,517 with a power swing door actuator having a rotary-to-linear conversion device configured to include an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions. Operation of the power swing door actuator is controlled in coordination with the power release operation of the primary latch assembly via the passive keyless entry system.

Some other door actuation systems, known as door presenter systems, are configured to include a power-operated door presenter operable to "present" the door by opening it only a predetermined amount, or distance, from a closed position to a partially-open position so as to allow subsequent manual movement of the door to its fully-open position.

Moreover, in some cases, the power door presenter may be dependent on power to the motor of the device in order to retract the power door presenter to allow for the door to be subsequently closed. However, in the case of a malfunction or a loss of power, closing the door back toward and against the power door presenter may cause the door presenter to experience a backdrive force that can be imparted on the motor, which can damage the motor. In some cases, the backdrive force may be insufficient to provide a force that can close the door, thereby making it difficult to close the door against the extended door presenter.

In view of the above, there remains a need to develop alternative power door presenter systems which address and overcome limitations associated with known power door actuation systems as well as to provide increased applicability while reducing cost and complexity.

SUMMARY

This section provides a general summary of the present disclosure and is not a comprehensive disclosure of its full scope or all of its features, aspects and objectives.

It is an aspect of the present disclosure to provide a power door presenter for a motor vehicle having a vehicle door moveable relative to a vehicle body between a closed position, a presented position, and a fully-open position.

It is a related aspect of the present disclosure to provide a power door presenter having overload protection that can receive a door slam force against an extensible member of the power door presenter.

It is another related aspect of the present disclosure to provide a power door presenter with an overload clutch that will disengage in response to receipt of a force that exceeds a clutch engagement threshold.

It is another related aspect of the present disclosure to provide a power door presenter with an overload clutch that will disengage in response to receipt of an external slam force that is transformed into a clutch disengagement force.

It is another related aspect of the present disclosure to provide a power door presenter with an overload clutch that is not electrically activated.

In accordance with these and other aspects, a door presenter with overload protection is provided. The door presenter includes an extensible member operatively coupled to a rotation-translation mechanism; a lead screw of the rotation translation mechanism coupled to the extensible member, wherein rotation of the lead screw causes translation along a linear axis of the extensible member relative to the lead screw; a motor operatively coupled to the lead screw, wherein actuation of the motor causes rotation of a drive gear; and an overload clutch disposed between the drive gear and the lead screw, the overload clutch having an engaged condition and a disengaged condition; wherein, in the engaged condition, rotation of the drive gear rotates the lead screw; wherein, in the disengaged condition, rotation of the lead screw is independent of the rotation of the drive gear and wherein the overload clutch shifts from the engaged condition to the disengaged condition in response to a predetermined axial load being exerted on the extensible member in a direction toward the clutch mechanism.

In accordance with another aspect, a door presenter with overload protection for pivoting a vehicle door relative to a vehicle body between a closed position and a partially open deployed position is provided. The door presenter includes an extensible member configured to act on one of the vehicle body and the vehicle door and an actuator for actuating movement of the extensible member between a retracted position corresponding to the closed position of the vehicle door and an extended position corresponding to the partially open deployed position of the vehicle door; and an overload clutch disposed between the extensible member and the actuator, the overload clutch having an engaged condition and a disengaged condition, wherein in the engaged condition the actuation of the actuator moves the extensible member between the retracted position and the extended position, and wherein in the disengaged condition, movement of the extensible member is independent of the actuating of the actuator.

In one aspect, the overload clutch shifts from the engaged position to the disengaged position in response to a predetermined axial load being exerted on the extensible member.

In one aspect, a lead screw is coupled to the extensible member, wherein rotation of the lead screw causes translation along a linear axis of the extensible member relative to the lead screw; wherein the actuator includes a motor operatively coupled to the lead screw, wherein actuation of the motor causes rotation of a drive gear; and wherein, in the engaged condition, rotation of the drive gear rotates the lead screw, wherein, in the disengaged condition, rotation of the lead screw is independent of the rotation of the drive gear.

In one aspect, the overload clutch shifts from the disengaged condition to the engaged condition in response to a predetermined relative rotation between the drive gear and lead screw.

In one aspect, translation of the extensible member in response to the predetermined axial load causes rotation of the lead screw relative to the drive gear when the overload clutch is disengaged.

In one aspect, the overload clutch includes a coupling lever and a coupling disk that are biased toward engagement therebetween, wherein the coupling lever is rotationally fixed to the drive gear and axially shiftable relative to the drive gear, wherein the coupling disk is rotationally and axially fixed to the lead screw.

In one aspect, the overload clutch includes at least one tooth projecting from one of the coupling lever or the coupling disk, and wherein the at least one tooth is received in at least one notch defined in the other of the coupling lever or the coupling disk when the overload clutch is engaged, wherein the tooth is received in the notch at a predetermined angular orientation of the coupling lever relative to the coupling disk.

In one aspect, the overload clutch includes a spring disposed axially between the drive gear and the coupling lever, and wherein the spring biases the coupling lever toward the coupling disk.

In one aspect, in response to the predetermined axial load, the coupling disk applies an axial load to the coupling lever and the coupling lever shifts relative to the drive gear, wherein a rotational load on the lead screw disengages the coupling disk from the coupling lever and disengages the overload clutch.

In one aspect, the at least one tooth cams out of engagement with a corresponding at least one notch to disengage the coupling disk from the coupling lever.

In accordance with another aspect, an actuator is provided. The actuator includes a lead screw coupled to a clutch assembly, wherein the clutch assembly has an engaged state and a disengaged state; a motor operatively coupled to the clutch assembly and configured to rotate the clutch assembly when the clutch assembly is in the engaged state, wherein rotation of the clutch assembly in the engaged state rotates the lead screw; and a drive nut coupled to the lead screw, the drive nut being rotationally fixed, wherein rotation of the lead screw causes translation of the drive nut; wherein a predetermined axial force on the drive nut toward the clutch assembly provides an axial and rotational force on the lead screw such that the clutch assembly is disengaged; wherein rotation of the lead screw when the clutch is disengaged decouples the motor from the lead screw such that the lead screw rotates freely relative to the motor.

In one aspect, the clutch assembly includes a coupling disk rotationally and axially fixed to the lead screw and a coupling lever rotationally fixed to a drive gear coupled to the motor, wherein rotation of the lead screw in response to the predetermined axial force disengages the coupling disk from the coupling lever.

In one aspect, the predetermined axial force causes an axial displacement of one of the coupling disk and the coupling lever away from the other.

In one aspect, the axial displacement of the coupling disk from the coupling lever is caused by a camming action between the coupling disk and the coupling lever.

In one aspect, the actuator includes a spring disposed between the coupling lever and the drive gear, wherein the spring biases the coupling lever toward the coupling disk.

In one aspect, the coupling disk and coupling lever are engaged via a tooth-and-notch connection having at least one tooth disposed within at least one notch.

In one aspect, rotation of the lead screw in response to a predetermined axial load causes the at least one tooth to cam out of engagement with the at least one notch.

In one aspect, further rotation of the coupling disk relative to the coupling lever after the clutch is disengaged re-engages the clutch.

In accordance with another aspect, a method of operating an actuator with overload protection is provided. The method includes providing a clutch assembly between an actuator and a motor; applying a predetermined axial load to the clutch assembly that exceeds a clutch engagement threshold; disengaging the clutch assembly in response to applying the predetermined axial load; and rotating a first portion of the clutch assembly relative to a second portion of the clutch assembly and, in response thereto, re-engaging the clutch assembly.

In one aspect, the clutch assembly includes a coupling disk and a coupling lever engaged via a tooth-and-notch connection having at least one tooth and at least one notch, the method further comprising rotating the coupling disk relative to the coupling lever in response to applying the predetermined axial load and camming the at least one tooth out of the at least one notch.

In one aspect, the actuator includes a rotationally fixed nut threaded onto a rotatable lead screw, wherein the rotatable lead screw is rotationally fixed to the coupling disk, the method further comprising translating the nut toward the coupling disk and rotating the lead screw and the coupling disk in response.

In accordance with another aspect, an overload clutch assembly for a door actuator for pivoting a vehicle door relative to a vehicle body between a closed position and an open deployed position is provided. The overload clutch assembly includes a coupling disk rotationally and axially fixed to an extensible member and a coupling lever rotationally fixed to a motor component, wherein movement of the extensible member in response to a predetermined axial force disengages the coupling disk from the coupling lever.

In accordance with yet another aspect, there is provided an overload clutch assembly for a door actuator for pivoting a vehicle door relative to a vehicle body between a closed position and an open deployed position, the overload clutch assembly including a coupling disk rotationally fixed to an extensible member and a coupling lever rotationally fixed to a motor component, such that movement of the extensible member in response to a predetermined axial force axially disengages one of the coupling disk and the coupling lever away from the other one of the coupling disk and the coupling lever.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

In general, example embodiments of a power door actuation system constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Figure 1A:
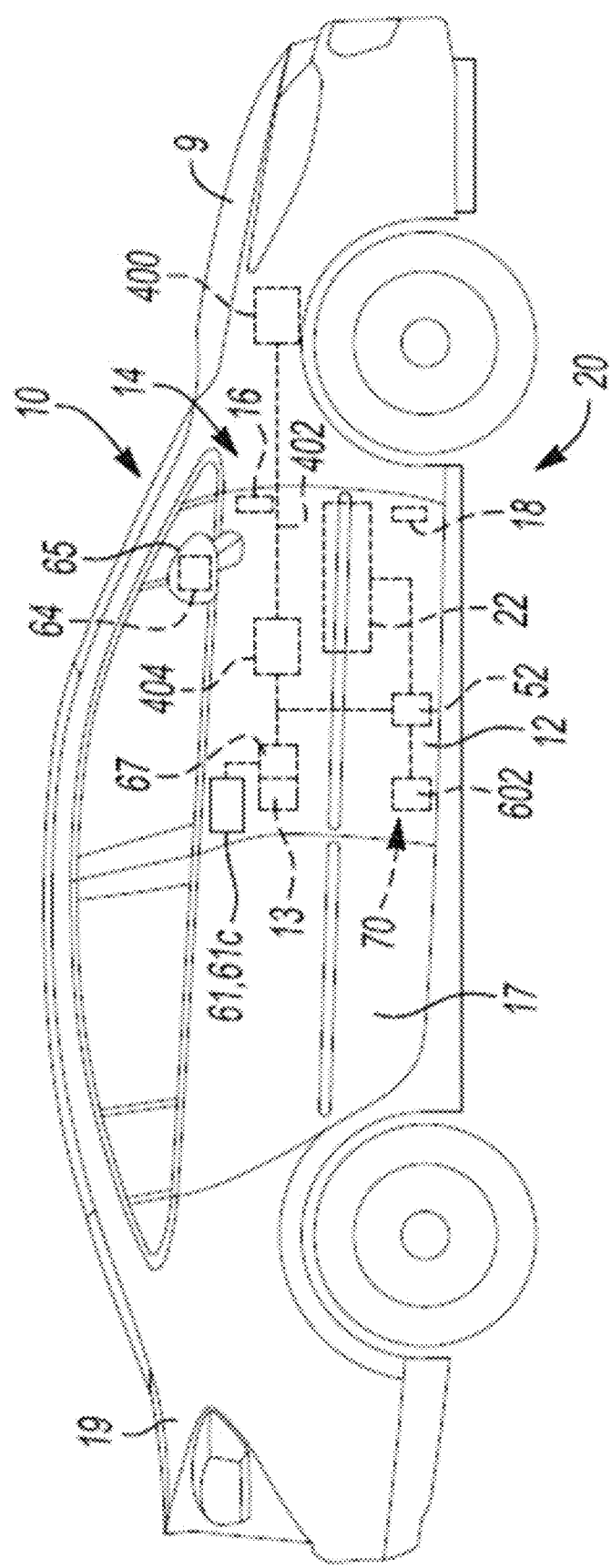
FIG. 1A illustrates an example motor vehicle equipped with a power door actuation system situated between a front passenger swing door and a vehicle body and which is configured to include a compact power door presenter.

Referring initially to FIG. 1A, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power door actuation system 20 is associated with the pivotal connection between first passenger door 12 and vehicle body 14. In accordance with a preferred configuration, power door actuation system 20 includes a power door presenter system 70, a vehicle door ECU 52, a primary latch assembly 13, and can also be configured with a power-operated swing door actuator 22 secured within an internal cavity of passenger door 12 for coordinated control of the opening and closing of the door 12. The motor vehicle 10 is illustrated in FIG. 1A may be provided as not including outside vehicle door handles on the vehicle door 12, and also in an alternate embodiment, outside door handles may be provided. A weather seal 3 is provided around the perimeter opening into the cabin 7 along the body 14 for engaging with the door 12 when the door 12 is in the fully closed position, to compress the seal 3 therebetween and provide a weather tight seal against ingress of external environmental conditions, such as road noise and rain and wind. Such a seal 3 generates a seal load on the striker 37 tending to urge the striker 37 out of the fishmouth of the latch assembly 13.

Figure 1B:
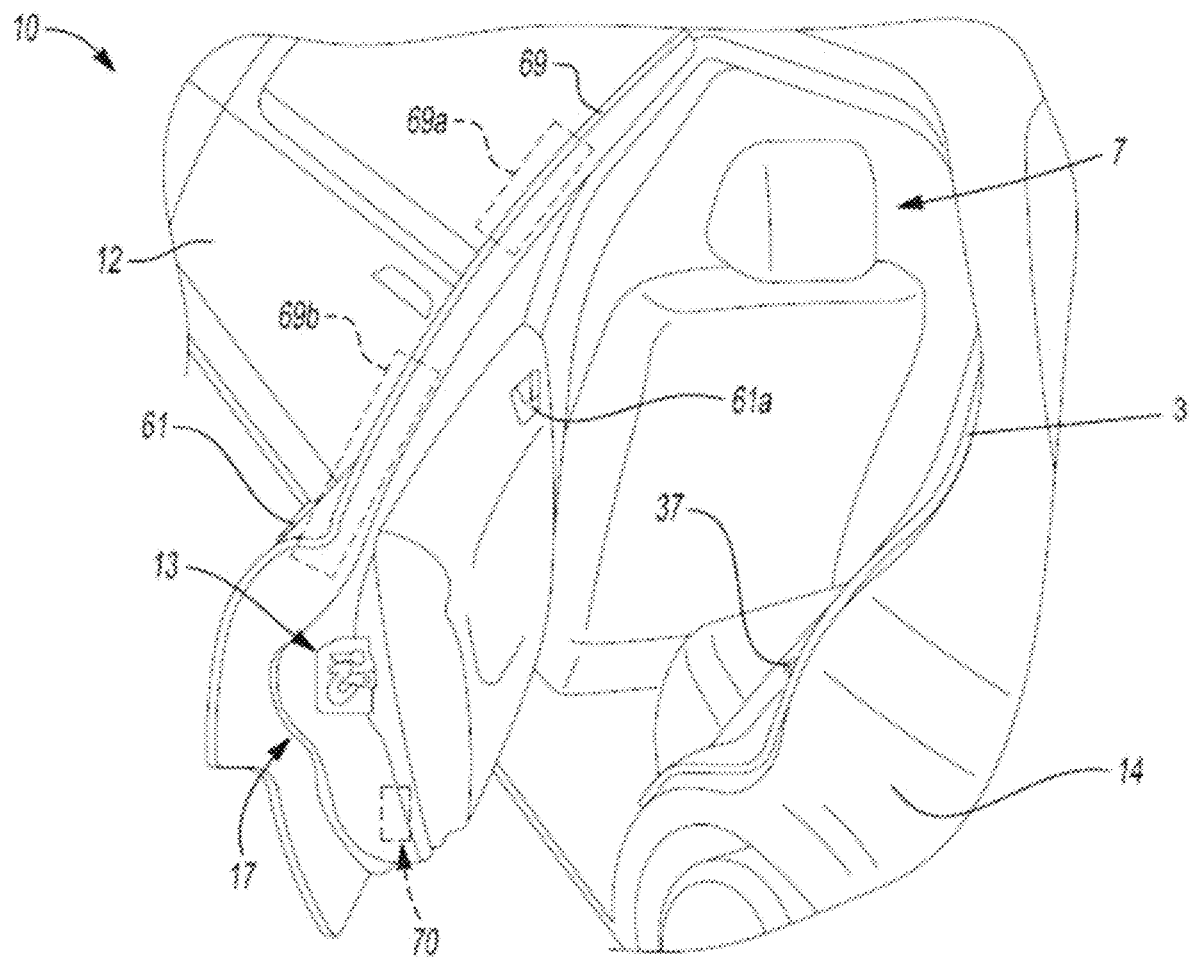
FIG. 1B is a view showing a primary latch assembly and a compact power door presenter installed in a passenger swing door associated with the vehicle shown in FIG. 1A.

Each of upper door hinge 16 and lower door hinge 18 include a door-mounting hinge component and a body-mounted hinge component that are pivotably interconnected by a hinge pin or post. While power door actuation system 20 is only shown in FIG. 1A in association with front passenger door 12, those skilled in the art will recognize that the power door actuation system 20 can also be associated with any other door, such as rear passenger doors 17 as shown in FIG. 1B, or also be associated with a liftgate (not shown), a hood 9, or a decklid 19. Also, while the door 12 is illustrated herein as being pivotally mounted to the vehicle body 14 for rotation relative to a vertical axis, it may be configured for rotation about a horizontal axis as would be the case for a liftgate, or other offset axis, or the like. For greater clarity, the vehicle body 14 is intended to include the 'non-moving' structural elements of the vehicle 10 such as the vehicle frame, structural support pillars and members, and body panels.

Referring to FIG. 1B, shown is a non-limiting embodiment of a primary closure latch assembly 13 for vehicle doors 12, 17 of vehicle 10. Closure latch assembly 13 can be positioned on vehicle door 12, 17 and arranged in a suitable orientation to engage a striker 37, mounted on vehicle body 14, when door 12, 17 is closed. Closure latch assembly 13 is not shown in detail in this disclosure, and can be one of many traditional closure latch assemblies known in the art or yet to be developed, and may include a latch mechanism having a ratchet and a pawl, a latch release mechanism having a pawl release lever, an inside door release mechanism having an inside release lever, a power release actuator for controlling powered actuation of the latch release mechanism, and a power lock actuator having a lock mechanism and an electric lock motor. Ratchet may be movable between two striker capture positions including primary or fully closed position and secondary or partially closed position whereat ratchet retains striker, and a striker release position (FIG. 1B) whereat ratchet permits release of striker 37 from a fishmouth provided by a latch housing of primary latch assembly 13.

Power release actuator can be used as part of a conventional passive keyless entry feature. When a person approaches vehicle 10 with an electronic key fob and actuates an outside door handle 61, for example, sensing both the presence of key fob and that door handle 61 has been actuated (e.g. via communication between a switch and an electronic latch control unit (ECU) shown at 67 (FIG. 1A) that at least partially controls the operation of closure latch assembly 13). In turn, latch ECU 67 actuates power release actuator to cause the latch release mechanism to release the latch mechanism and shift primary closure latch assembly 13 into an unlatched operating state so as to facilitate subsequent opening of vehicle door 12. Power release actuator can be alternatively activated as part of a proximity sensor based entry feature (radar based proximity detection for example), for example when a person approaches vehicle 10 with an electronic key fob and actuates a proximity sensor 61c, such as a capacitive sensor, or other touch/touchless based sensor (based on a recognition of the proximity of an object, such as the touch/swipe/hover/gesture or a hand or finger, or the like), (e.g. via communication between the proximity sensor 61c (FIG. 1A) and an electronic latch control unit (ECU) shown at 67 (FIG. 1A) that at least partially controls the operation of closure latch assembly 13). In turn, latch ECU 67 actuates power release actuator to cause the latch release mechanism to release the latch mechanism and shift primary closure latch assembly 13 into an unlatched operating state so as to facilitate subsequent opening of vehicle door 12. Also, power release actuator can be used in coordinated operation with power power-operated swing door actuator 22 and power door presenter system 70, as further described below.

Figure 4:
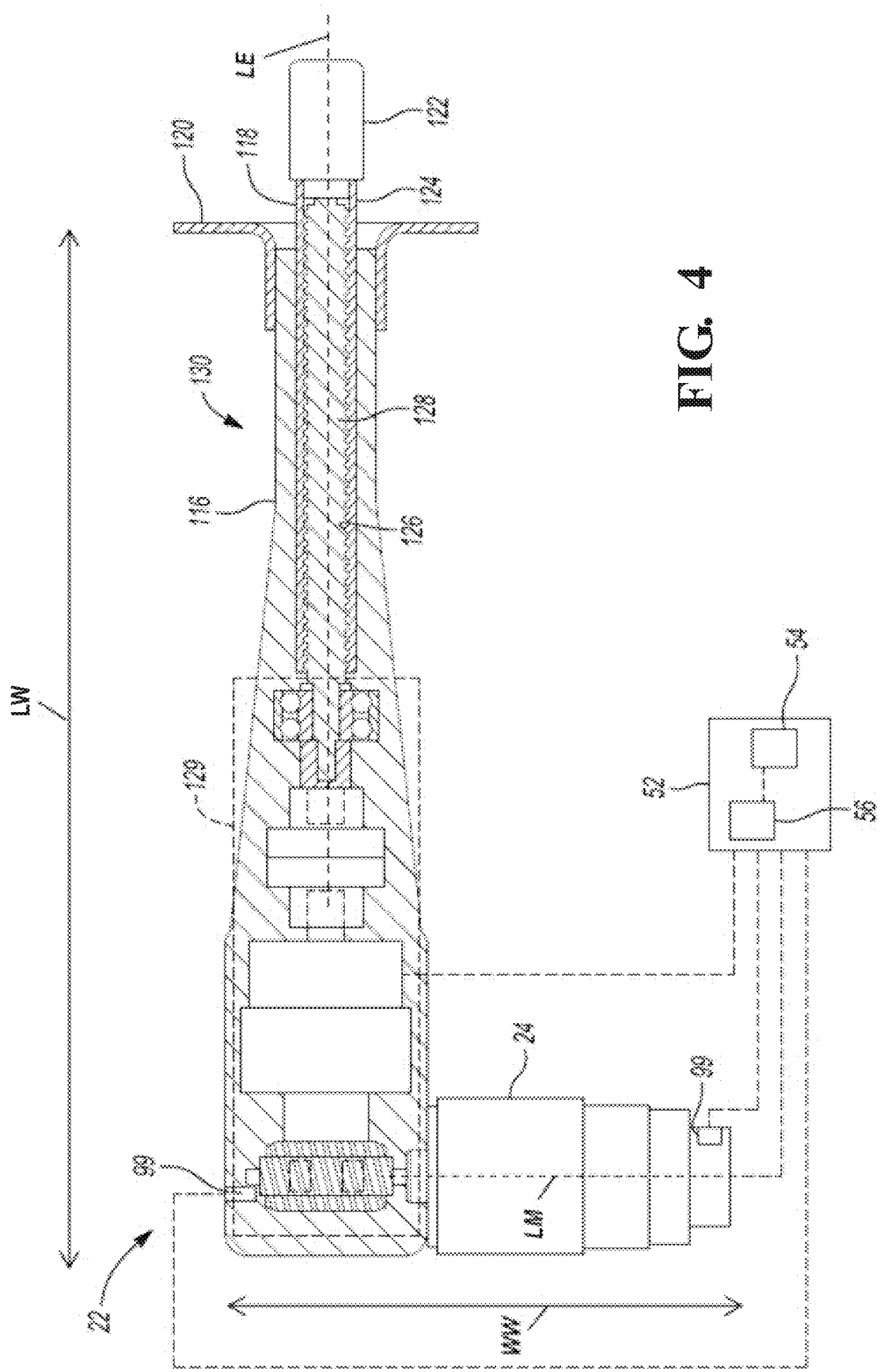
FIG. 4 is a sectional view of a power swing door actuator having a motor and extensible member.

With reference to FIG. 4, power door actuation system 20 can include a power-operated swing door actuator 22 having the features of being typically mounted in door 12 and located near door hinges 16, 18; providing for full or partial open/close movement of door 12 under actuation; providing an infinite door check function; and providing for manual override (via a slip clutch) of power-operated swing door actuator 22, as desired. Power operated swing door actuator 22 can function to automatically swing passenger door 12 about its pivot axis between its open and closed positions. Typically, power-operated swing door actuator 22 can include a power-operated device such as, for example, an electric motor 24 and a rotary-to-linear conversion device 130 that are operable for converting the rotary output of the electric motor 24 into translational movement of an extensible member 118. In many power door actuation arrangements, the electric motor 24 and the conversion device 130 are mounted to passenger door 12 and a distal end of an extensible member 118 is fixedly secured to vehicle body 14 proximal the door hinges 16, 18. Driven rotation of the electric motor 24 causes translational movement of the extensible component 118 which, in turn, controls pivotal movement of passenger door 12 relative to vehicle body 14. As also shown, an electronic control module, or referred herein to as swing door ECU 52, is in communication with electric motor 24 for providing electric control signals thereto for control thereof. Swing door ECU 52 can include hardware such as a microprocessor 54 and a memory 56 having executable computer readable instructions stored thereon for implementing the control logic stored as a set of computer readable instructions in memory 56 for operating the power door actuation system 20. In operation, extension of the extensible member 118 will in turn cause the door 12, 17 to pivot about hinges 16 and 18 to open the door 12, 17. The above described general construction and control of the power operated swing door actuator 22 may also be applied to the power door presenter 70, as further described below, such as a controllable rotation-translation mechanism that may extend an extensible member.

In the context of the present disclosure, the power-operated swing door actuator 22 may be operated to move the door 12 from a presented position, or assist with the presentment of the door 12 by the power door presenter system 70. The power-operated swing door actuator 22 has a housing 116 and an extensible member 118. The extensible member 118 is moveable between extended and retracted positions relative to housing 116. The power-operated swing door actuator 22 may be mounted between inner and outer sheet metal panels in a lengthwise orientation, where the actuator housing 116 is fixed (e.g. permanently fixed, for example using bolts or other fastener types) to the swing door 12 via a bracket 120. The extensible member 118 is mounted (e.g. permanently fixed, for example using bolts or other fastener types) to the vehicle body.

Referring additionally to the cross-sectional view of the power-operated swing door actuator 22 in FIG. 4, the housing 116 defines a cylindrical chamber in which the extensible member 118 slides. The extensible member 118 has a ball socket 122 at an external end thereof for attachment (e.g. permanent attachment) to the vehicle body 14. The ball socket 122 is connected to a cylindrical tube 124 which has an internal thread 126 proximate an internal end of the extensible shaft 118. The internal thread 126 is engageable with a lead screw 128 driven by the electric motor 24 via a drive train 129 including various gear, clutch and transmission mechanisms, as generally known in the art. The power-operated swing door actuator 22 shown in FIG. 4 includes the extensible member 118 that has a longitudinal axis LE that is non-coaxial and non-adjacent with longitudinal axis LM of the motor 24, and it is recognized as having a lengthwise LW and a widthwise WW packaging dimension.

Of course, other power-operated swing door actuator configurations may be employed.

Now referring back to FIG. 1B, the door 12 may have a conventional opening lever or inside door handle 61a located on an interior facing side of the door 12 facing the inside of the passenger compartment 7 for opening the door 12 (e.g. including unlocking and opening the door latch 13, as well as commanding operation of the power door presenter system 70 and/or the power-operated swing door actuator 22). This opening lever or inside door handle 61a can trigger a switch connected to the latch ECU 67 such that, when the switch is actuated, the latch ECU 67 facilitates that the power door presenter system 70 is activated (i.e. the extension member 618 (FIGS. 3 and 5) is deployed or extended and thus facilitates powered presentment or movement of the door 12). Subsequent such presentment, the latch ECU 67 may facilitate that the power-operated swing door actuator 22 is activated (i.e. the extension member 118 is deployed or extended) to continue the automatic opening of the door 12. In the alternative, the power-operated swing door actuator 22 may be powered on at a point before the final presentment position is reached so as to provide a seamless transition between the two stages of door opening (i.e. both motors are overlapping in operation for a short time period). Alternatively, the latch ECU 67 may facilitate that the power-operated swing door actuator 22 is operated as a door check (i.e. the extension member 118 is deployed or extended and maintained at such a deployed or extended condition) until the user manually takes control of the door 12 to further open it to a fully opened position.

Now referring back to FIG. 1A, the power door actuation system 20 and the primary closure latch assembly 13 are electrically connected to a main power source 400 of the motor vehicle 10, for example a main battery providing a battery voltage $V_{batt}$ of 12 V, through an electrical connection element 402, for example a power cable (the main power source 400 may equally include a different source of electrical energy within the motor vehicle 10, for example an alternator). The electronic latch ECU 67 and/or swing door ECU 52 are also coupled to the main power source 400 of the motor vehicle 10, so as to receive the battery voltage $V_{batt}$; the electronic latch ECU 67 and/or swing door ECU 52 are thus able to check if the value of the battery voltage $V_{batt}$ decreases below a predetermined threshold value, to promptly determine if an emergency condition (when a backup energy source may be needed) occurs.

As shown in the schematic block diagram of FIG. 1A, a backup energy source 404, which may be integrated forming part of an electronic control circuit of the electronic latch ECU 67 and/or swing door ECU 52, or may be separate therefrom, is configured to supply electrical energy to the power door actuation system 20 and/or the primary closure latch assembly 13, and to the same electronic control circuit of the electronic latch ECU 67 and/or swing door ECU 52, in case of failure or interruption of the main power supply from the main power source 400 of the motor vehicle 10. In an illustrative embodiment, electronic control circuit of the electronic latch ECU 67 and backup energy source 404 may be integrated into latch assembly 13. In the event of a failure in a main power supply from the main power source 400, electronic latch ECU 67 and/or swing door ECU 52 may be configured to supply power from the backup energy source 404 to power-operate door presenter 602 for a presentment of the vehicle door 12 to the presented position.

In an illustrative example, the backup energy source 404 includes a group of low voltage supercapacitors (not shown) as an energy supply unit (or energy tank) to provide power backup to the power door actuation system 20 and/or the primary closure latch assembly 13, even in case of power failures. Supercapacitors may include electrolytic double layer capacitors, pseudocapacitors or a combination thereof. Other electronic components and interconnections of a backup energy source 404, such as a boost module to increase the voltage from the backup energy source 404 to an actuator, such as the power door presenter system 70 for example, are disclosed in co-owned U.S. Patent Publication US 2015/0330116.

Figure 2:
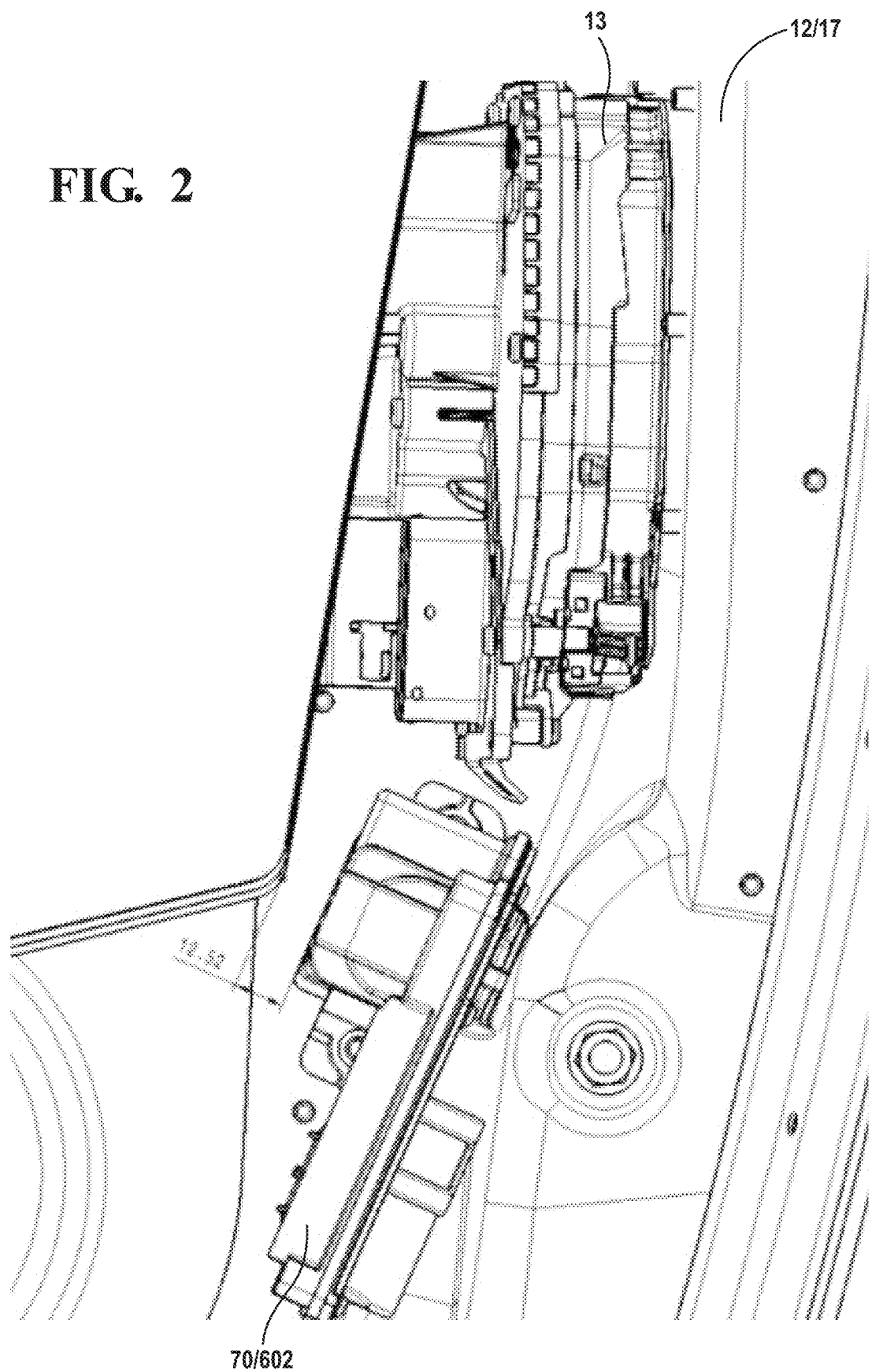
FIG. 2 illustrates a partial side view the power door presenter and the primary latch assembly disposed inside the passenger swing door.
Figure 3:
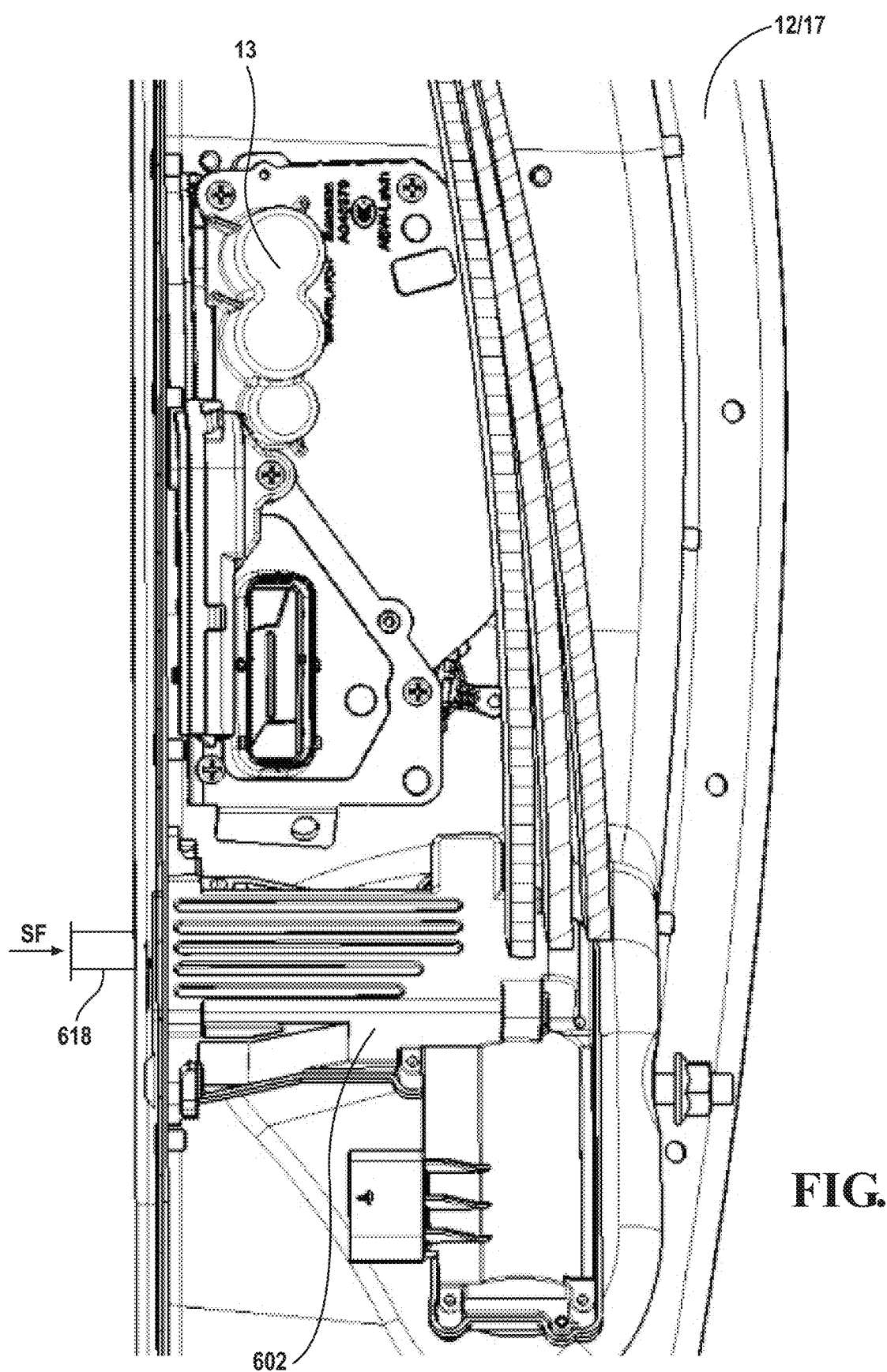
FIG. 3 illustrates a partial front view of the power door presenter and primary latch assembly disposed inside the passenger swing door.
Figure 5:
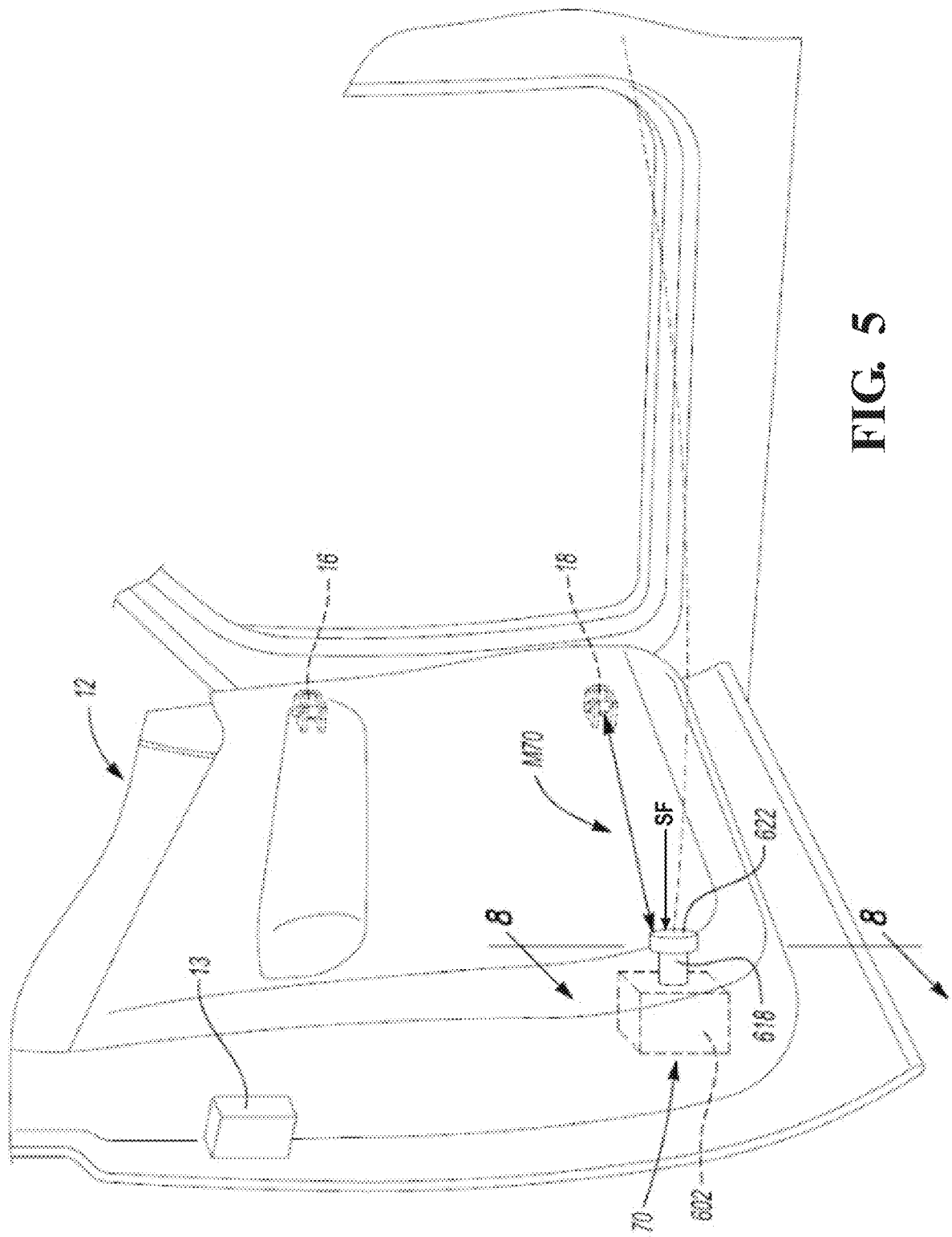
FIG. 5 illustrates the power door actuation system having a compact power door presenter mounted to the vehicle door, in accordance with an illustrative embodiment.
Figure 6:
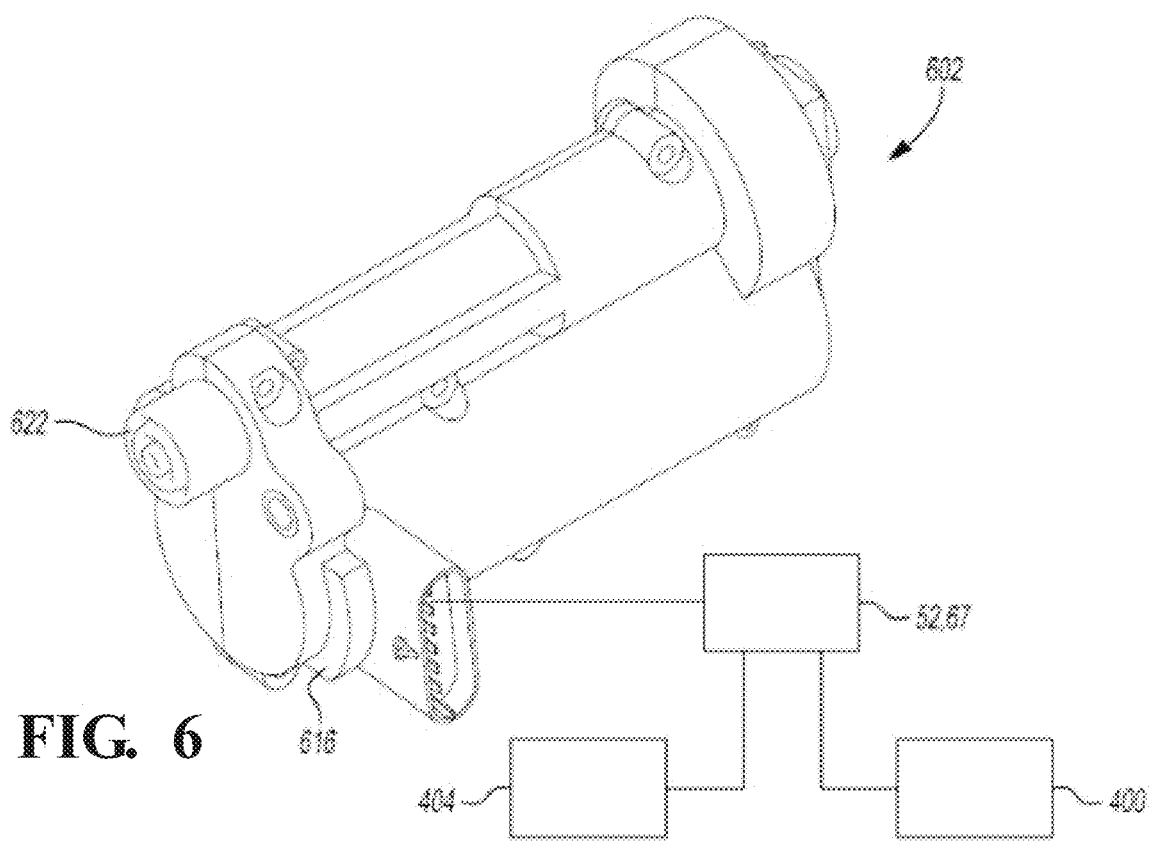
FIG. 6 is a perspective view of the presenter of FIG. 5 in accordance with an illustrative embodiment.
Figure 7:
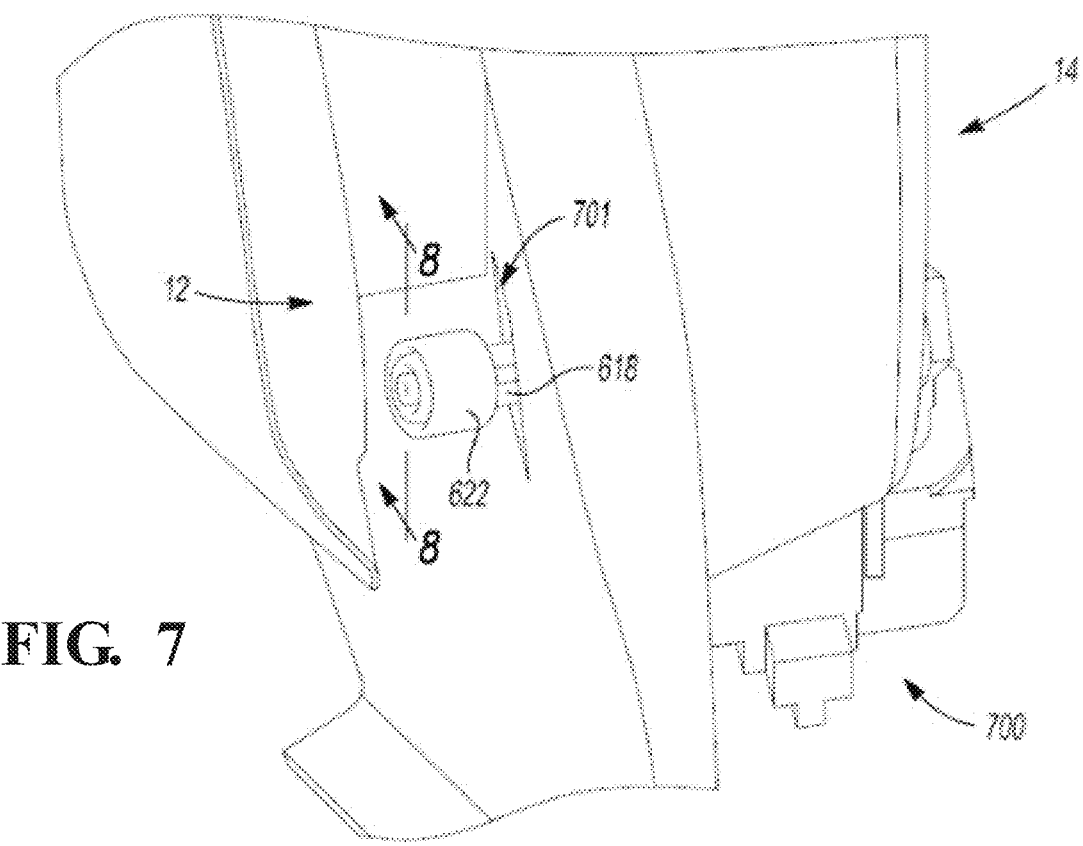
FIG. 7 illustrates the power door actuation system having a presenter mounted to the vehicle body, in accordance with an illustrative embodiment.

Now referring to FIGS. 2, 3, and 5-7, in addition to FIGS. 1A and 1B, in accordance with preferred configurations, a power door presenter system 70 (which can be configured for door 12 in conjunction with operation of the power-operated swing door actuator 22, or can be configured independently of the operation of power operated swing door actuator 22) generally includes a power-operated door presenter 602 secured within an internal cavity (e.g. for example within or adjacent a pillar 700 of vehicle body 14 as shown in FIG. 7 and therefore associated with vehicle body 14, or alternatively associated with passenger door 12 as illustrated in FIG. 5) and including an electric motor 652 (FIG. 9), and a drive mechanism having an extensible component 618 extendable through a port 701. Driven rotation of the drive mechanism causes controlled translation of the extensible component 618 which, in turn, controls pivotal movement of passenger door 12 relative to vehicle body 14 as the extensible component 618 abuts against the vehicle body 14 in the exemplary configuration of the power-operated door presenter 602 being mounted to the vehicle door 12 as shown in FIGS. 2, 3, and 5, (or alternatively, the extensible component 618 abuts against the vehicle door 12 in the exemplary configuration illustrated in FIG. 7 showing the power operated door presenter 602 mounted within the vehicle body 14). As such, it is recognized that location of the power-operated door presenter 602 between vehicle body 14 and vehicle door 12 can be at any position, as shown by example or otherwise, as desired.

The power-operated door presenter 602 of power door presenter system 70, as further explained below and as illustrated in FIGS. 2, 3, and 5, can be located at the bottom of door 12 below primary latch assembly 13 opposite to door hinges 16, 18. Alternatively, the presenter 602 of power door presenter system 70 can be mounted to vehicle body 14 as illustrated in FIG. 7. Preferably, the power-operated door presenter 602 can be located on the vehicle door 12 (or vehicle body 14) at a position away and opposite from the door hinges 16, 18 so as to gain mechanical advantage relative to the hinges 16, 18 thus requiring less force to open the vehicle door 12 from the closed position as would be required if the vehicle door 12 was acted upon at a position nearer the door hinges 16, 18, as is the case for the power-operated swing door actuator 22. Such mechanical advantage can be represented by a moment arm M70, where M70 may be greater than moment arm of the power-operated swing door actuator 22 depending on the location of the power door presenter system 70 relative to the hinges 16, 18.

In another embodiment of power door presenter system 70, the power door presenter system 70 may be positioned adjacent to a distal end of door 12 near the hem flange at a position above the primary latch assembly 13. Positioning the power door presenter system 70 opposite hinges 16, 18 provides a greater mechanical advantage for a door-moving action and allows exertion of a more effective moving force (e.g. 250 Newtons) or a greater moment arm on the door 12 as compared to the power swing actuator 22. Due to this mechanical advantage, a smaller motor 652 may be employed requiring less power to operate, and correspondingly a smaller back up energy source 404 may therefore be provided to operate the power door presenter system 70 to present the door 12 in the event of a power failure of the main power source 400. Further, due to this increase in mechanical advantage, the power operated door presenter 602 can provide ice breaking functionality as well as assist with the movement of the door 12 in a post-crash condition, where for example the door 12 may be damaged and thus seized or jammed relative to the vehicle body 14 and thus requiring a greater than normal opening force to overcome this state. The extensible member 618 may project away in a perpendicular configuration, or the extensible member 618 may project at an angle.

As a result, a smaller more compact and lower energy consuming electric motor 652 can be provided, as well as a more compact, less costly, lower weight, back-up energy source 404 due to the lower energy requirements of the power-operated door presenter 602 required to effectuate a movement of the door 12 from a closed position to a presented position. Also, the power door actuation system 20 can now be operated as follows: since power door presenter system 70 can provide for a partial open/close movement, or presentment, of door 12, the power-operated swing door actuator 22 can be deactivated during such movement of the door, and activated after the presentment for either continued movement or door checking functionality. Since the power door presenter system 70 now assumes the task of overcoming the initial high torque movement the power-operated swing door actuator 22 would normally assume if operating without coordination with the power door presenter system 70, the motor 24 of the power-operated swing door actuator 22 can be reduced in size providing cost and weight savings. As a result, a less powerful electric motor 24 can be provided with the power-operated swing door actuator 22 as the power-operated swing door actuator 22 may be controlled to subsequently operate to move the door 12 from the presented position to other partially opened or fully opened positions whereat the mechanical advantage for the power-operated swing door actuator 22 is greater than when the door 12 is in its closed position. Alternatively, the power-operated swing door actuator 22 and the power door presenter system 70 can be operated in conjunction to present the door 12. As such, actuation of power door presenter system 70 can provide for coordinated and controlled presentment and opening of door 12 in conjunction with power-operated swing door actuator 22.

While the door 12 can be employed as part of a door system including an outside door handle 61, the power door presenter system 70 can be employed for coordinated and controlled presentment of door 12 to a user requesting opening of the door 12 in the configuration of the door 12 without a door handle, for example having a proximity sensor 61c in lieu of an outside door handle 61. In such a configuration, the presentment of door 12 would be sufficient to move the door 12 away from the vehicle body 14 so that the fingers of the user exterior the vehicle 14 can be slipped between the vehicle body 14 and the door 12 to grasp, for example about door edge 69 as illustratively shown at possible handle regions 69a and 69b in FIG. 1B, and to subsequently pull the door 12 to open it. The power door presenter system 70 can also be employed for coordinated and controlled presentment of door 12 to a user requesting opening of the door 12 using inside door handle 61a. In all configurations, the presentment of door 12 may be sufficient to move the door 12 away from the vehicle body 14 to break through any ice build-up on door 12 and vehicle body 14 tending to prevent a door 12 from easily opening i.e. acting as an ice breaker function. In all configurations, the presentment of door 12 would be sufficient to move the door 12 away from the vehicle body 14 overcoming the larger force moments required to move the door 12 from the closed position to the presented position as would be required to be overcome by the power-operated swing door actuator 22 operating without the coordination of power door presenter system 70.

A non-limiting embodiment of power door presenter system 70 will now be described with reference to FIGS. 5 through 24 to generally include a power door presenter 602. In general, power door presenter 602 is adapted to be rigidly secured to vehicle body 14 or the vehicle door 12, such as by securing a housing 616 encapsulating the various components of the power door presenter 602 as will be further described herein below. FIG. 6 illustrates one example of a power door presenter 602 in which extensible member 618 having bumper 622 extends along an axis that is generally parallel to a motor axis. FIGS. 2, 3, and 8-21 illustrate examples of the power door presenter 602 in which the axis of the extensible member 618 is perpendicular to the motor axis, similar to the arrangement of the power-operated swing door actuator 22 shown in FIG. 4. It will be appreciated that the power door presenter 602 may operate similarly in both arrangements of the motor axis relative to the axis of extension.

Figure 8:
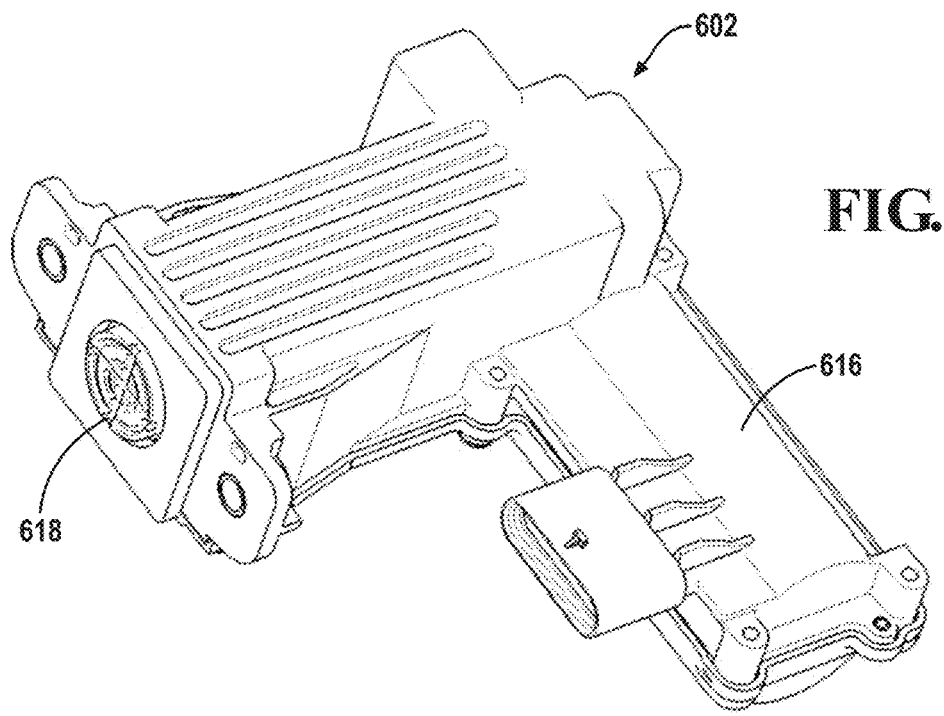
FIG. 8 is a perspective view of the power door presenter shown in FIGS. 2 and 3.
Figure 9:
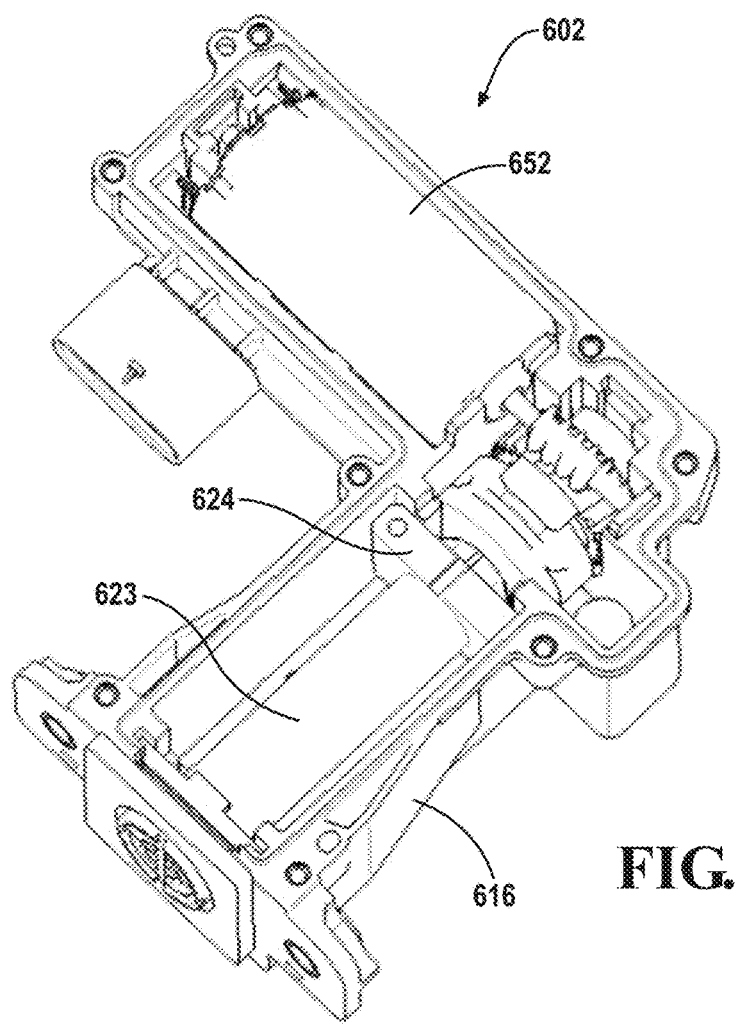
FIG. 9 is an internal perspective view of the power door presenter of FIG. 8, illustrating a motor, gears, clutch assembly, and extensible member.
Figure 10:
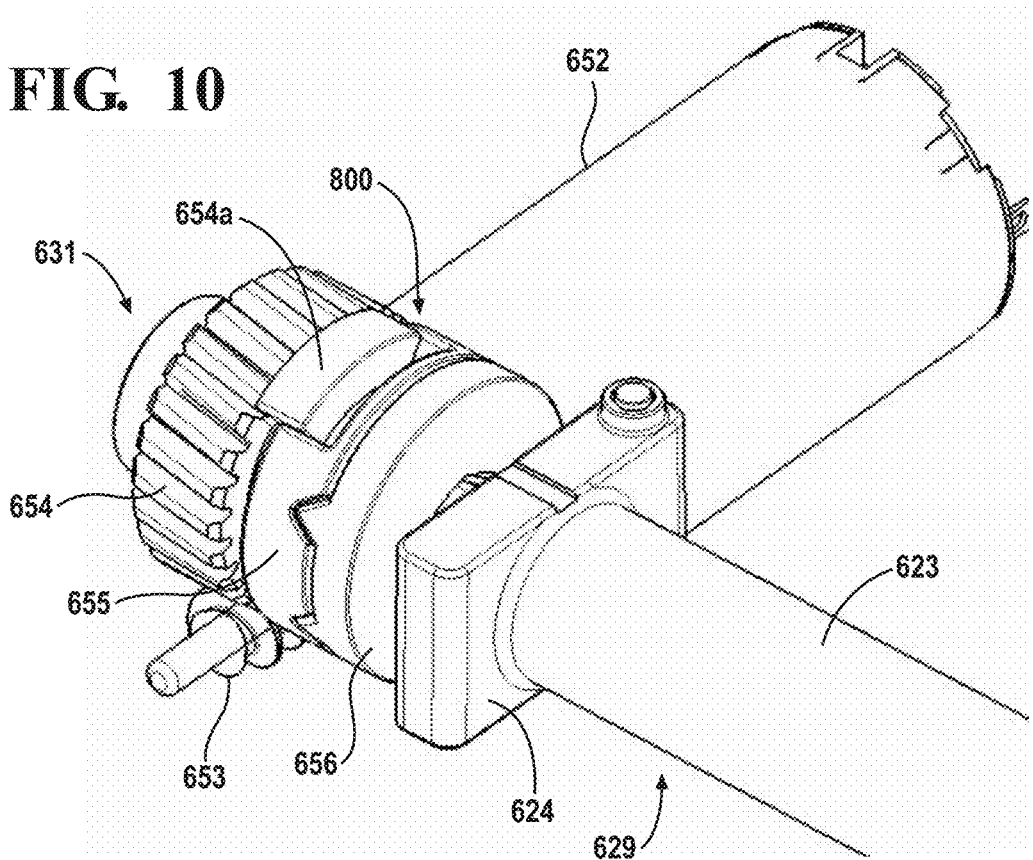
FIG. 10 is a perspective view of the clutch assembly, a worm gear, and an extensible member of the power door presenter.
Figure 11:
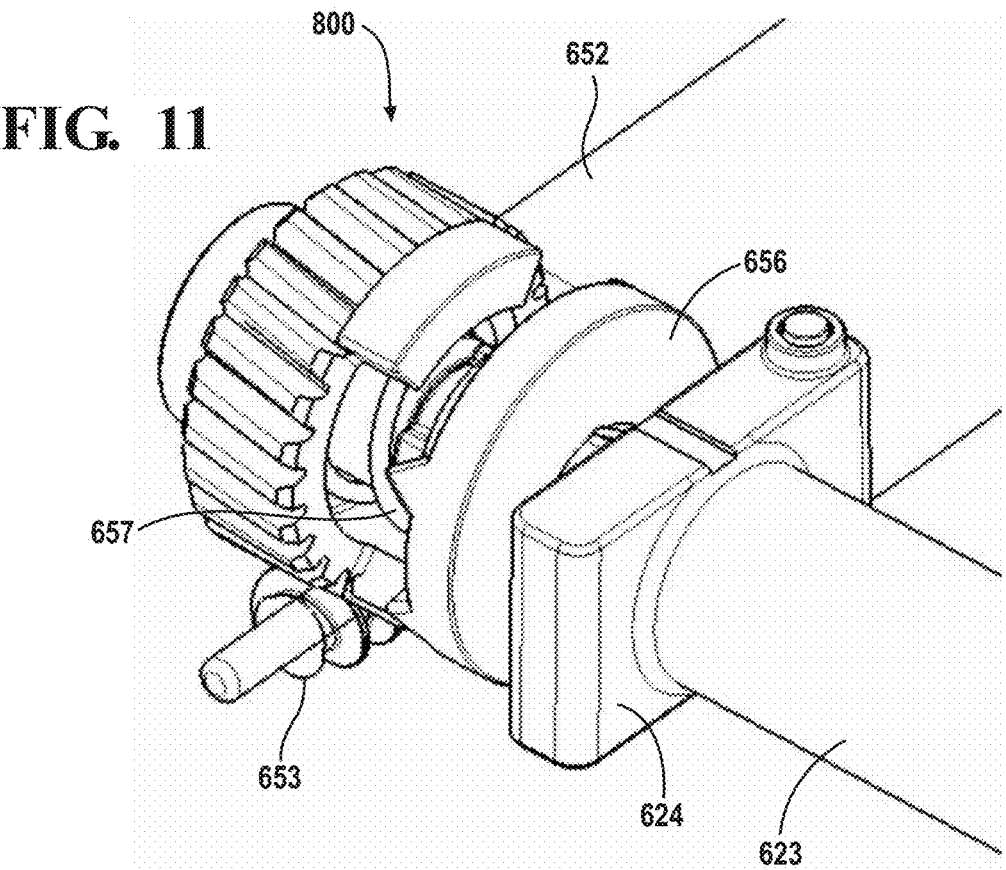
FIG. 11 is a perspective view of the clutch assembly with a portion removed to illustrate a spring of the clutch assembly.

In FIG. 6, a non-limiting embodiment of a power door presenter 602 is shown. The power door presenter 602 has a housing 616 defining a cylindrical chamber in which an extensible member 618 slides. The extensible member 618 can be configured having an external distal end as discussed for any of the above embodiments, and is shown, by way of example and without limitation, as having a bumper, such as an elastic bumper 622 for abutment with the vehicle body 14 or vehicle door 12, 17. It will be appreciated that in some figures the bumper 622 is not shown, but that the bumper 622 may still be used. FIG. 6 illustrates one embodiment of the power door presenter 602 where the extensible member 618 extends generally parallel to the motor axis of the presenter 602. FIGS. 8 and 9 illustrate another embodiment in which the extensible member 618 extends generally perpendicular to the motor axis. It will be appreciated that various features of each of these embodiments may be interchangeable, except in cases in which the features would conflict, such as the orientation of the motor axis relative to the extensible member 618.

Figure 12:
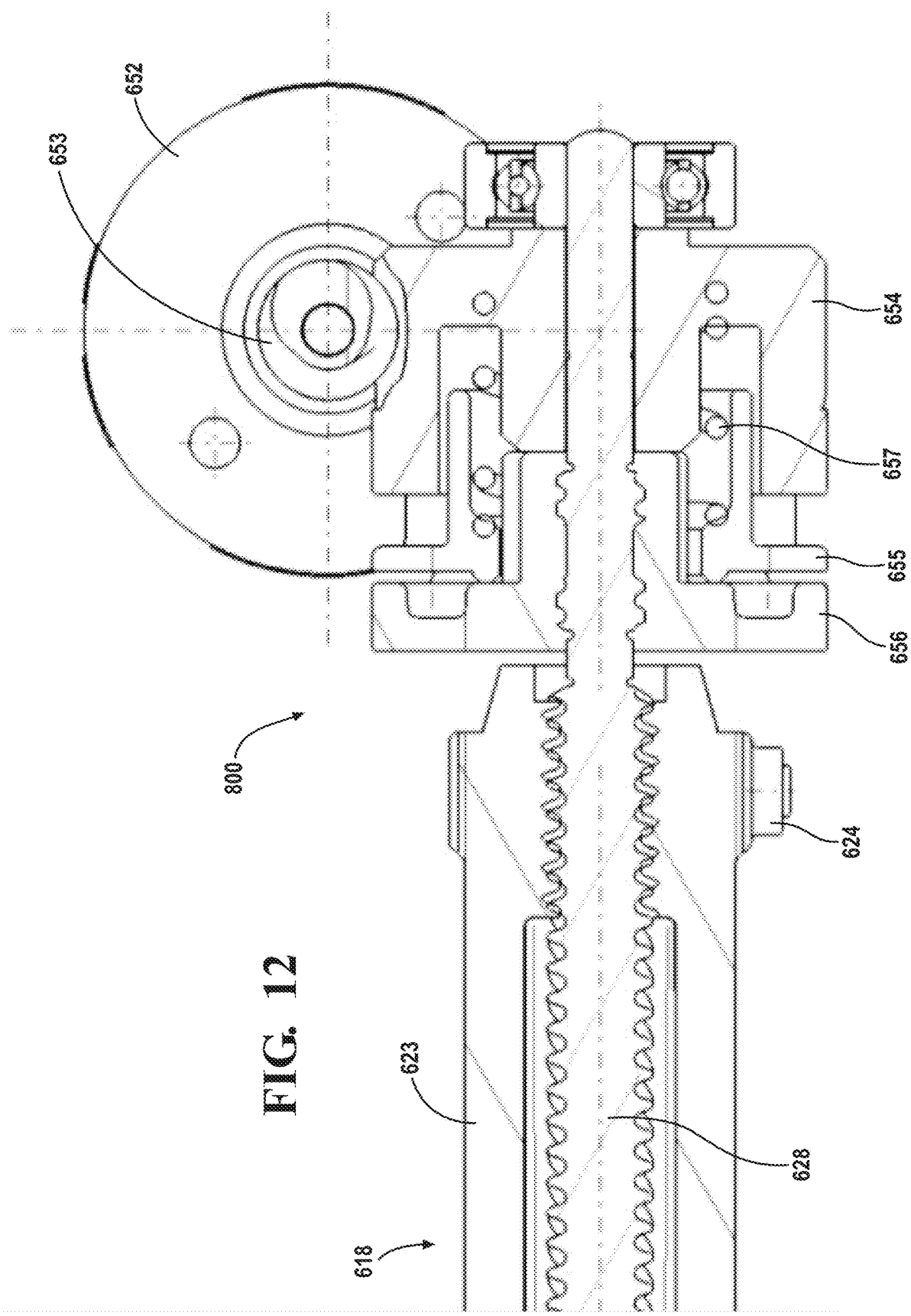
FIG. 12 is a cross-sectional view of the clutch assembly, illustrating the drive nut, the lead screw, a coupling disk, a coupling lever, and a worm gear, and a spur gear driven by the motor.
Figure 13:
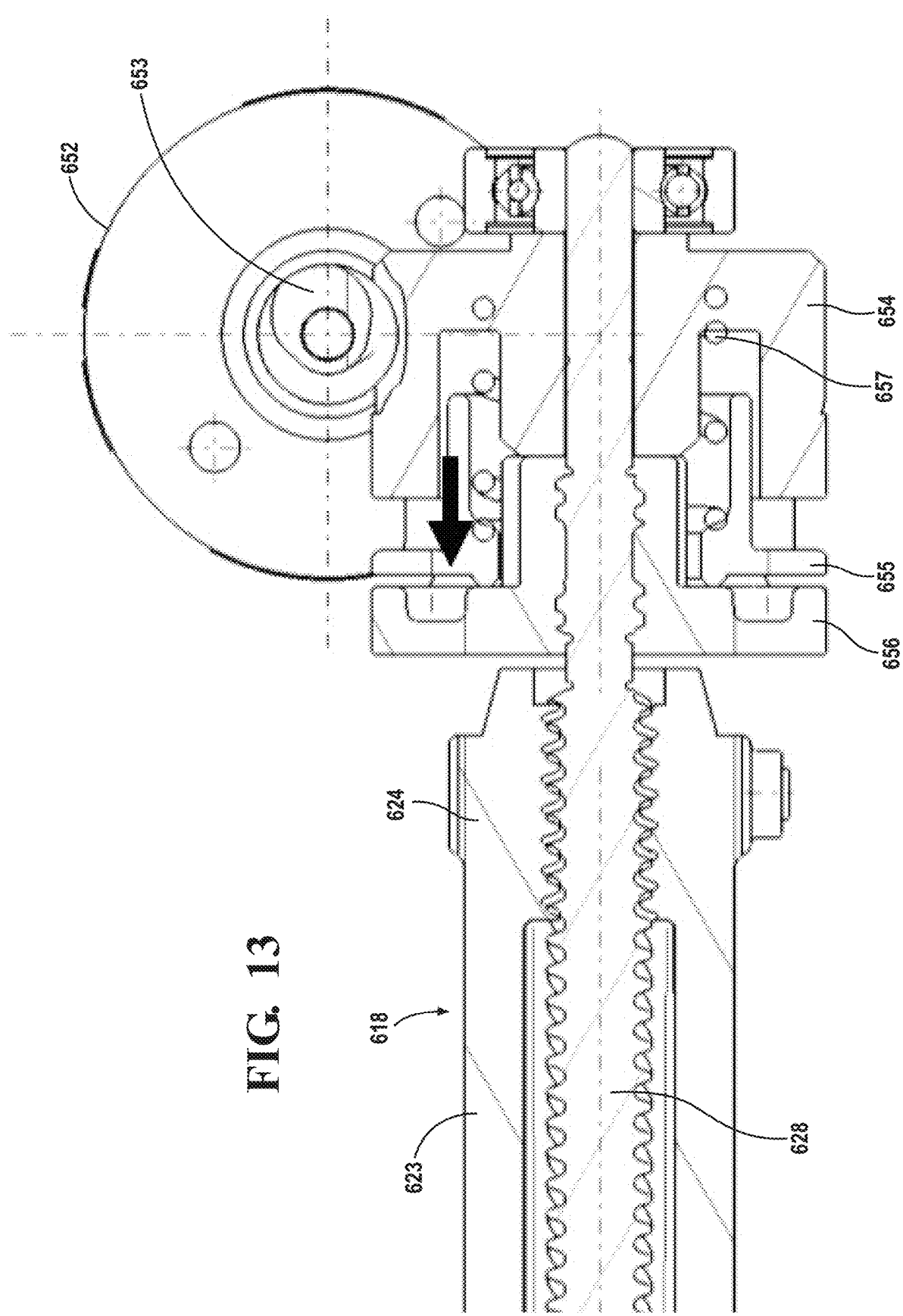
FIG. 13 is a cross-sectional view of the clutch assembly illustrating the spring acting to bias the coupling lever toward the coupling disk.

The power door presenter 602, and in particular the extensible member 618, further includes a cylindrical tube 623 which is rotatably connected (such as via threaded engagement) to a lead screw 628 connected to a proximal end of the extensible member 618 via a nut 624. In one aspect, the tube 623 is threaded onto the nut 624, with the nut 624 having the threaded engagement with the lead screw 628. In another aspect, the nut 624 may be integrally formed with the tube 623. In one aspect, the tube 623 may include internal threading in addition to or as alternative to the nut 624. As shown throughout the figures, the nut 624 has a generally rectangular outer profile. The outer profile may be sized and arranged to fit within a cavity of the housing 616 to hold the nut 624 in a generally rotationally fixed position, such that rotation of the lead screw 628 will cause translation of the nut 624 and tube 623. The lead screw 628 is threadingly matable with the internally threaded nut tube 623 or nut 624, to permit relative rotation and translation between lead screw 628 and the nut 624 and/or tube 623. The nut 624 and tube 623 are rotationally fixed, such that rotation of the lead screw 628 causes translation of the extensible member 618. FIGS. 12 and 13 illustrate the nut 624 on the lead screw 628, with the tube 623 integrally formed with the nut 624, and the nut 624 having the threaded engagement with the lead screw 628.

The extensible member 618 is non-rotatably and axially moveable on leadscrew 628 between a retracted position and an extended position relative to housing 616. When extensible member 618 is located in its extended position, door 12 is urged into a partially opened deployed or "presented" position. The configuration of the lead screw 628 and nut 624 i.e. the thread pitch angles and geartrain unit are such so as to provide a manual reversibility of extensible member 618 from the deployed position to its retracted position, for example by urging the extension member 618 towards its retracted position by a closing of the door 12 abutting the elastic bumper 622.

Referring to FIGS. 10-13, in one aspect, the door presenter 602 includes a clutch assembly 800 for causing the rotation of the lead screw 628 when the clutch is engaged in response to actuation of the motor 652. The door presenter 602 includes the motor 652, which operates to a drive a spur gear 653, in one form. The spur gear 653 meshes with a worm gear 654. The worm gear 654 is coupled to a coupling lever 655, which is coupled to a coupling disk 656. A coupling spring 657 is disposed between the coupling lever 655 and the worm gear 654, where the coupling spring 657 urges the coupling lever 655 toward the coupling disk 656 to maintain an engagement between the coupling lever 655 and the coupling disk 656 in the absence of other outside forces. Further description may continue to reference to the motor 652 with the spur gear 653 and worm gear 654, but it will be appreciated that other connection mechanisms to transfer power from the motor or actuate another gear or mechanism rotationally fixed to the coupling lever 655 may also be used. For example, the motor may drive one half of a bevel or hypoid gear, with the coupling lever 655 including the other half. Alternatively, the motor 652 may be parallel to the lead screw 628 and two gears may be meshed side by side. In another aspect, additional intermediate gears may be included for gear reduction.

In one aspect, the lead screw 628 extends axially through the coupling disk 656, the coupling lever 655, and the worm gear 654. In this aspect, the lead screw 628 may be supported for rotation relative to the these components. In one aspect, the lead screw 628 may be supported for rotation by these components, or by another bearing surface. The coupling disk 656 is rotationally secured to the lead screw 628, such that rotation of the coupling disk 656 causes rotation of the lead screw 628, and vice versa. The lead screw 628 is supported for rotation relative to the worm gear 654, such that the lead screw 628 may rotate relative to the worm gear 654, and where rotation of the worm gear 654 alone may not rotate the lead screw 628 absent engagement of the clutch assembly 800. Rather, for rotation of the worm gear 654 to rotate the lead screw 628, the rotation of the worm gear 654 may be transferred to the coupling lever 655 and the coupling disk 656, such that the coupling disk 656 will rotate and cause joint rotation with the lead screw 628 (based on rotational securement between the coupling disk 656 and the lead screw 628). It is recognized that the power door presenter 602 may be embodied as other configurations, such as a rack and pinion type presenter for example as shown in commonly owned US Patent Application No. US20190112859A1 entitled "Power door with toothed rod crank mechanism", the entire contents of which are incorporated herein by reference having the teachings of the overload clutch described herein provided between the rack and the pinion, or the pinion and the motor, as but only a non-limiting example for illustrative purposes. Power door presenter 602 may in one configuration be permanently fixed between the vehicle body 14 and the door 12, 17, for example as shown in commonly owned U.S. Pat. No. 10,370,886 entitled "Swing door actuation system having a power swing door actuator and a control system", the entire contents of which are incorporated herein by reference. In the preferred configuration, power door presenter 602 is permanently fixed to one of the vehicle body 14 and the door 12,17 and is not permanently fixed to the other one of the vehicle body 14 and the door 12, 17 but rather configured to abut therewith, in a configuration such as is shown in commonly owned US Patent Application US20190153768A1 entitled "Power door presenter", the entire contents of which are incorporated herein by reference.

The worm gear 654 may include at least one axially projecting lug 654a that extends into a corresponding recess 655a of the coupling lever 655. Alternatively, the coupling lever 655 may be interpreted as having a projection received in a recess formed in the second worm gear 654. In either case, the worm gear 654 and the coupling lever 655 may be coupled for joint rotation while allowing the coupling lever 655 to shift axially relative to the second worm gear 654. Put another way, the coupling lever 655 is rotationally fixed relative to the gear 654 and axially shiftable relative to the gear 654. The worm gear 654 may also be referred to as a drive gear. Thus, when the gear 654 is actuated to rotate, the coupling disk 655 will be caused to rotate whether or not the coupling disk 655 is axially shifted.

Figure 14:
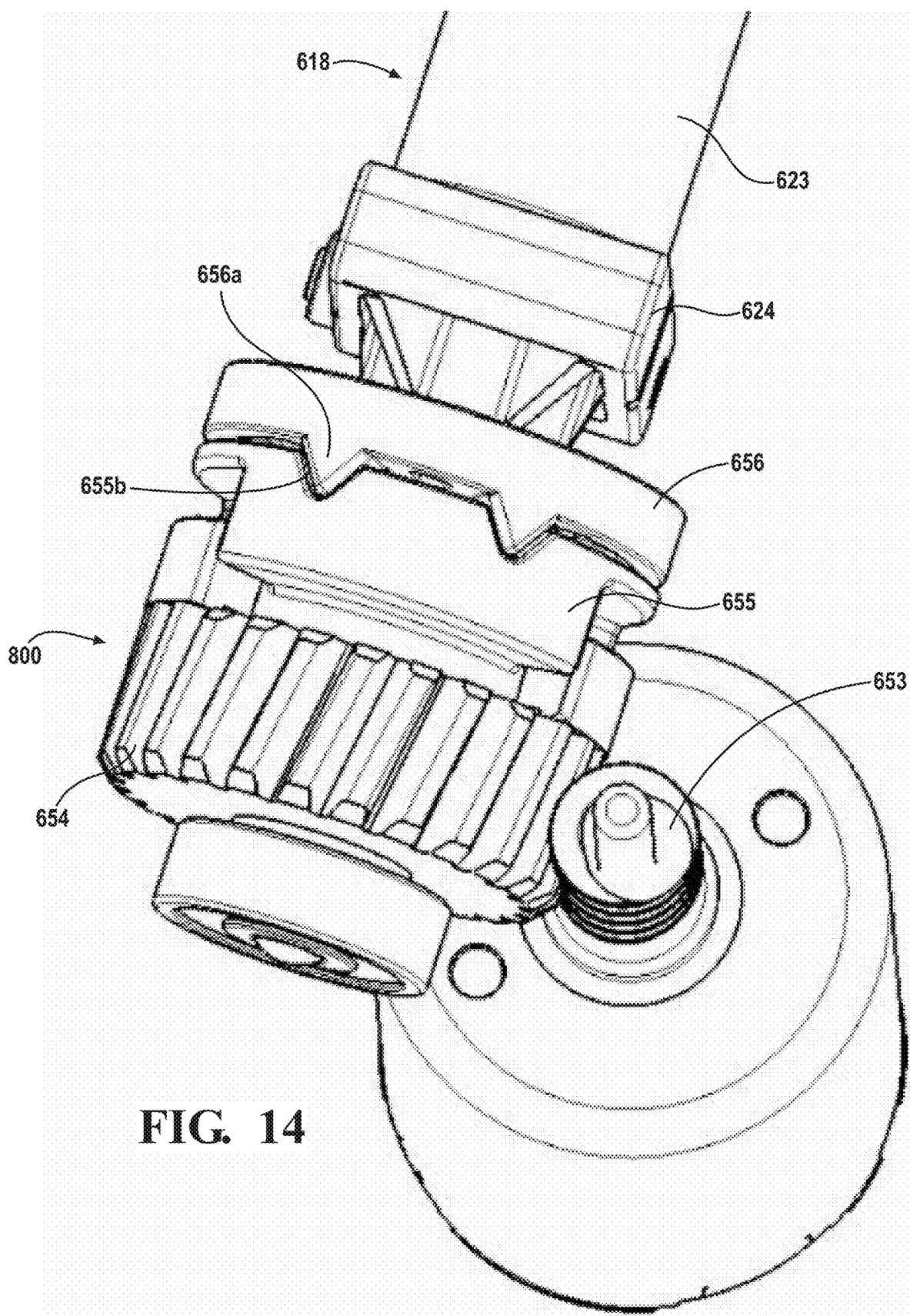
FIG. 14 is a perspective view of the clutch assembly illustrating a tooth-and-notch connection between the coupling disk and the coupling lever, a sliding engagement between the worm gear and the coupling lever.
Figure 15:
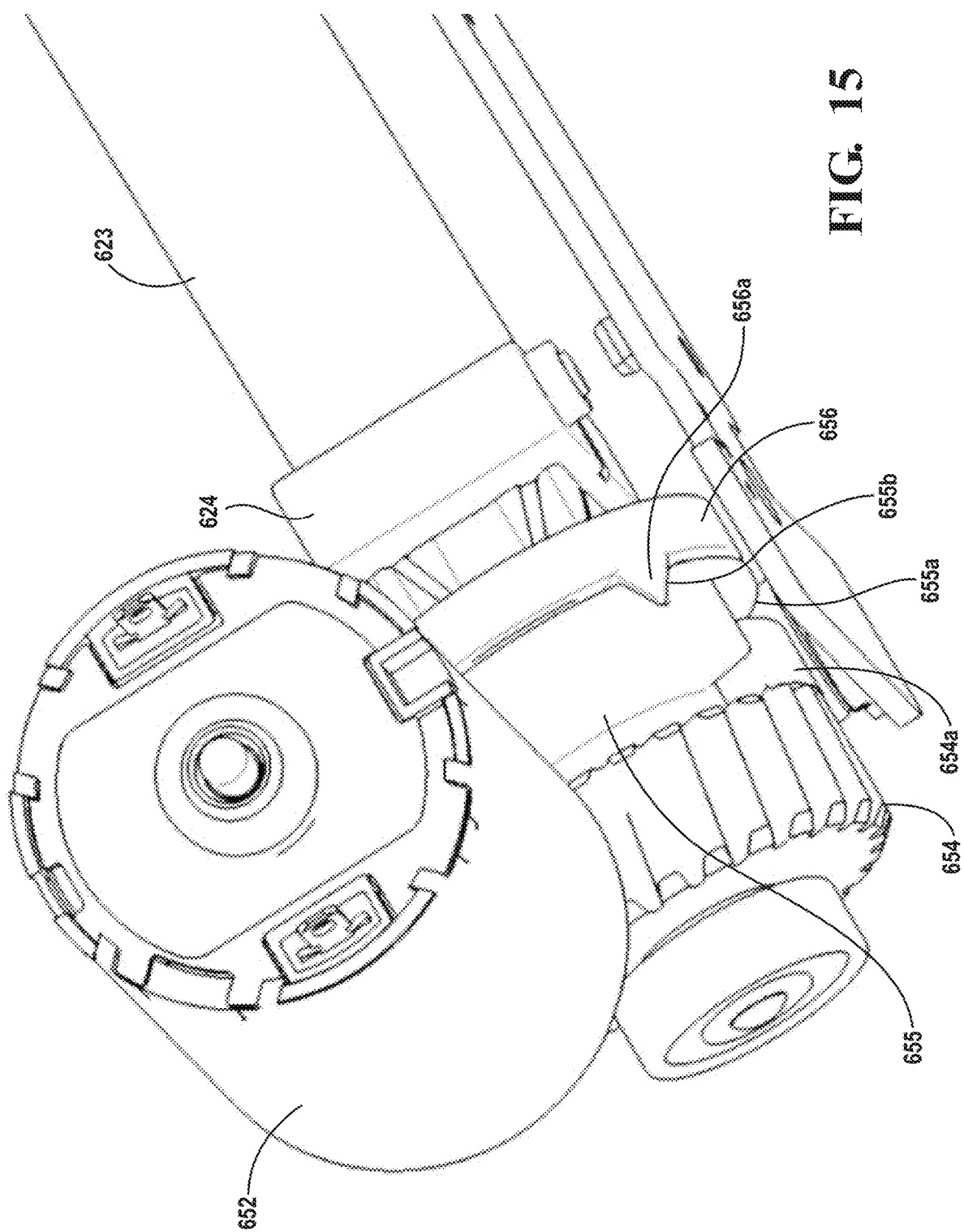
FIG. 15 is another perspective view of the clutch assembly of FIG. 14.
Figure 16:
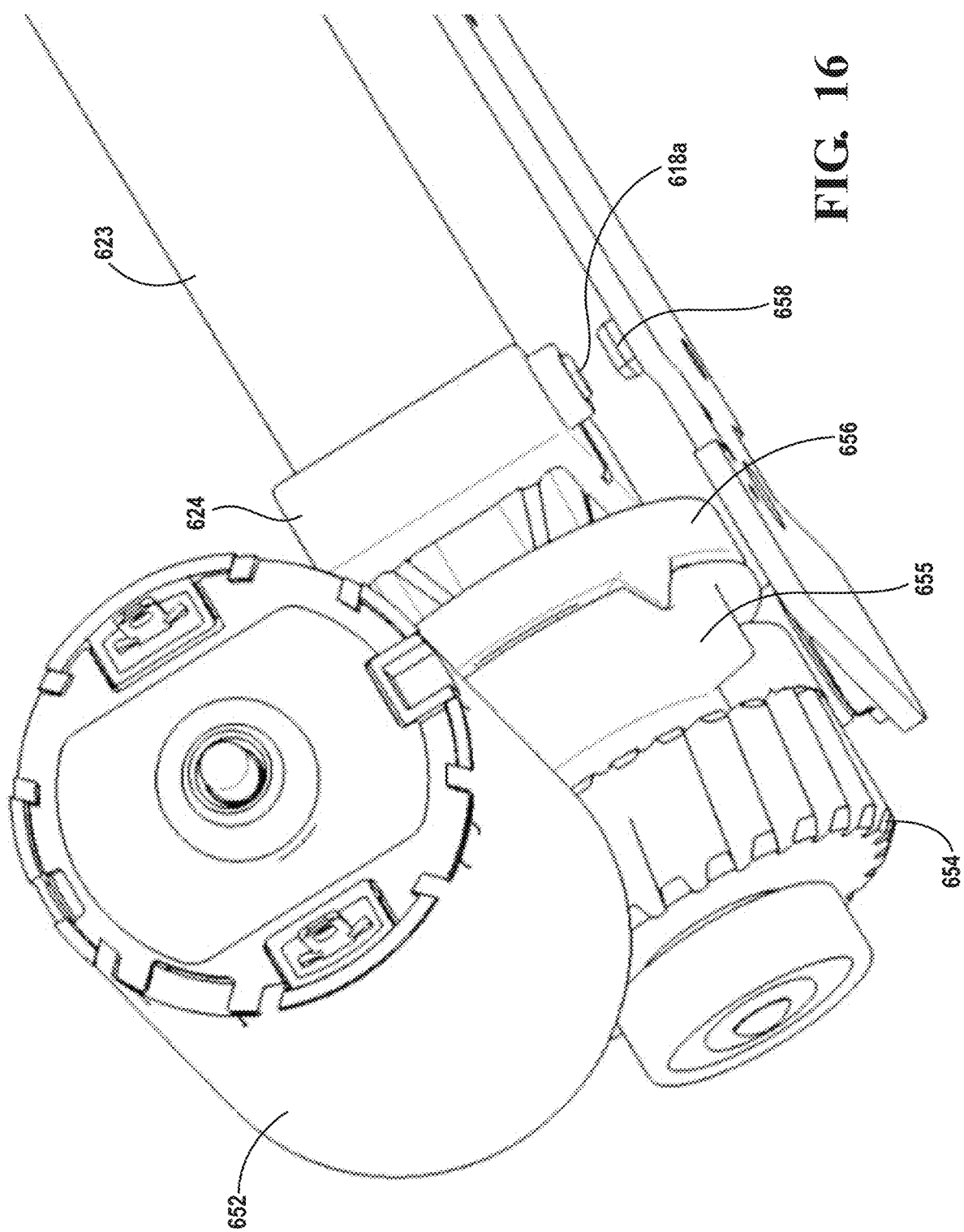
FIG. 16 is another perspective view of the clutch assembly of FIGS. 14 and 15, illustrating a sensor adjacent the extensible member.

With reference to FIGS. 14-16, the coupling lever 655 may further include a plurality of notches 655b that axially face the coupling disk 656. The notches 655b may be disposed on the opposite axial side of the coupling lever 655 relative to the recess(es) 655a. Additionally, the coupling disk 656 may include a plurality of coupling teeth 656a that are sized and arranged to be received in the notches 655b of the coupling lever 655. In another aspect, the teeth 656a may be included on the coupling lever 655, with the corresponding notches 655b disposed in the coupling disk 656. For purposes of further discussion, the teeth 656a will be described as projecting from the coupling disk 656, and the notches 655*b* will be described as being formed in the coupling lever 655.

In one aspect, and with additional reference to FIGS. 22A-22D, the notches 655*b* and the teeth 656*a* are arranged circumferentially with non-uniform spacing, such that the teeth 656*a* will be received in the notches 655*b* at a predetermined angular orientation relative to each other. For example, two of three notches 655*b* may be positioned relatively closer to each other than to the third notch 655*b*, with the teeth 656*a* having similar or corresponding circumferential spacing. Thus, upon disengagement of the teeth 656*a* from the notches 656*b* and rotation in a first direction of the teeth 656*a* relative to the notches 656*b*, the teeth 656*a* will only be received in the notches 656*b* upon a full rotation, where all the teeth 656*a* are aligned with all of the notches 655*b*. Until a full rotation, even if one of the teeth 656*a* is aligned with one of the notches 655*b*, the other of the teeth 656*a* will be misaligned and will prevent aligned teeth 656*a* from being received in the aligned notch 655*b*. It will be appreciated that other quantities of teeth and notches may be used, with different circumferential spacing, such that all of the teeth will align with all of the notches at other predetermined angular orientations.

Thus, the coupling lever 655 and the coupling disk 656 may cooperate as a toothed clutch to allow rotation of the coupling disk 656 in response to rotation of the coupling lever 655 when all of the teeth 656*a* are received in the notches 655*b*, and to allow rotation of the coupling disk 656 relative to the coupling lever 655 when the teeth 656*a* are outside of the notches 656*b*. The use of this toothed clutch mechanism can therefore reduce, limit, or prevent backdriving the motor 652 in response to backdriving the extensible member 618, by allowing the lead screw 628 and coupling disk 656 to rotate relative to the coupling lever 655 and worm gear 654 when the clutch assembly 800 is disengaged, which may occur in response to a slam force or the like which causes the teeth to slide or cam out of the notches due to the resulting rotational force on the coupling disk 656 caused by the axial slam force.

As described above, the coupling lever 655 and worm gear 654 are arranged for axial sliding engagement while being coupled for joint rotation. Accordingly, the coupling lever 655 may shift toward the worm gear 654 against the bias of the spring 657 in response to a slam force or other substantial axial force on the coupling lever 655. For example, a slam force on the extensible member 618 and nut 624 will cause an axial force to be exerted on the lead screw 628 that is in threaded engagement with the nut 624. This axial force exerted on the lead screw 628 will act on the coupling disk 656 (which is rotationally and axially fixed to the lead screw 628) and the coupling lever 655, shifting the coupling lever 655 toward the worm gear 654 against the bias in the spring 657.

The backdriving exerted on the nut 624 will urge the lead screw 628 and the coupling disk 656 to rotate in a first direction. The force of rotation on the coupling disk 656 will cause the teeth 656*a* and notches 655*b* to slide or cam out of engagement. For example, the disk 656 with the teeth may rotate, with the coupling lever 655 remaining in generally the same position. With the teeth 656*a* disengaged from the notches 655*b*, the coupling disk 656 is permitted to rotate relative to the coupling lever 655. Thus, the nut 624 and extensible member 618 may move axially toward the coupling lever 655 and worm gear 654 while the coupling lever 655 and worm gear 654 do not rotate. The coupling disk 656 and lead screw 628 are permitted to rotate as the nut 624 and tube 623 travel axially. With the worm gear 654 and coupling lever 655 stationary due to the disengagement of the teeth/notches, there is little to no backdriving load applied to the motor 652.

As the lead screw 628 and coupling disk 656 rotate, the spring 657 urges the coupling lever 655 toward the coupling disk 656, and the backdriving force of the nut 624 on the lead screw 628 urges the coupling disk 656 toward the coupling lever 655. Accordingly, upon a full rotation of the coupling disk 656 (or other predetermined amount of rotation), the teeth 656*a* may be received in the notches 655*b* of the coupling lever 655, such that subsequent operation of the door presenter 602 may be performed by actuating the worm gear 654 and coupling lever 655 to rotate the coupling disk 656 and the lead screw 628 to translate the nut 624 away from the coupling disk 656. Similarly, the motor 652 may be rotated in the opposite direction with the clutch 800 engaged to retract the extensible member 618.

The above described operation is possible in response to traditional door slam load, where there is sufficient force to cause a rotational load on the lead screw 628 and the coupling disc 656 to overcome the spring bias 657 that is biasing the coupling lever 655 and the coupling disk 656 together. A small or otherwise nominal load on the extensible member 618 and the nut 624 may be insufficient to cause a rotational load high enough to overcome the spring bias and cause the teeth 656*a* to cam out of engagement with the notches 655*b*. This is desirable, such that the extensible member 618 can stay extended in response to nominal loads, such as the weight of the door that acts against the force exerted by the extensible member 618 during the traditional door presenting process. The components described herein, such as the shape and arrangement of the teeth 656*b* and the load in the spring 657 can be tailored to disengage the clutch assembly 800 at a predetermined and desirable slam load. For example, the angle of the teeth and notches, the size of the teeth and notches, the amount of teeth and notches, the diameter of the coupling lever 655 and disk 656, and/or the like may be modified and adjusted to tailor the predetermined load for disengagement.

As described above, a plurality of non-uniformly circumferentially spaced teeth 656*b* are described such that a specific angular orientation may be selected where the teeth 656*a* engage the notches 655*b*. However, it will be appreciated that other circumferential spacing may be used to allow for engagement at different and/or multiple angular orientations. For example, two diametrically opposed teeth 656*b* may be used such that the teeth 656*b* will engage the notches 655*b* at 180 degree intervals. A single tooth 656*b* for a 360 degree interval may also be used. Different numbers of teeth 656*a* and notches 655*b* may also be used, such as having more notches 655*b* than teeth 656*a*. Regardless of the specific arrangement of teeth 656*a* and notches 655*b*, coupling disk 656 and coupling lever 655 have an engaged state and a disengaged state, with the engaged state occurring at one or more predetermined relative angular orientations therebetween.

With reference to FIG. 16, the door presenter 602 may include a sensing arrangement that includes a sensor 658, such as a hall sensor, that may be used for detecting a position of the extensible member 618. The extensible member 618 may include a magnet 618*a* having a magnetic field that is detectable by the hall sensor 658. When the magnet 618*a* is positioned near the hall sensor 608 such that the hall sensor 608 will detect the magnetic field, the system can detect that the extensible member 618 is in a retracted position. When the extensible member 618 is extended, the magnet 618a will be out of range of the sensor 608, and the system will detect that the extensible member is at least partially extended. The position of the extensible member 618 may also be determined via other sensing means.

Figure 17:
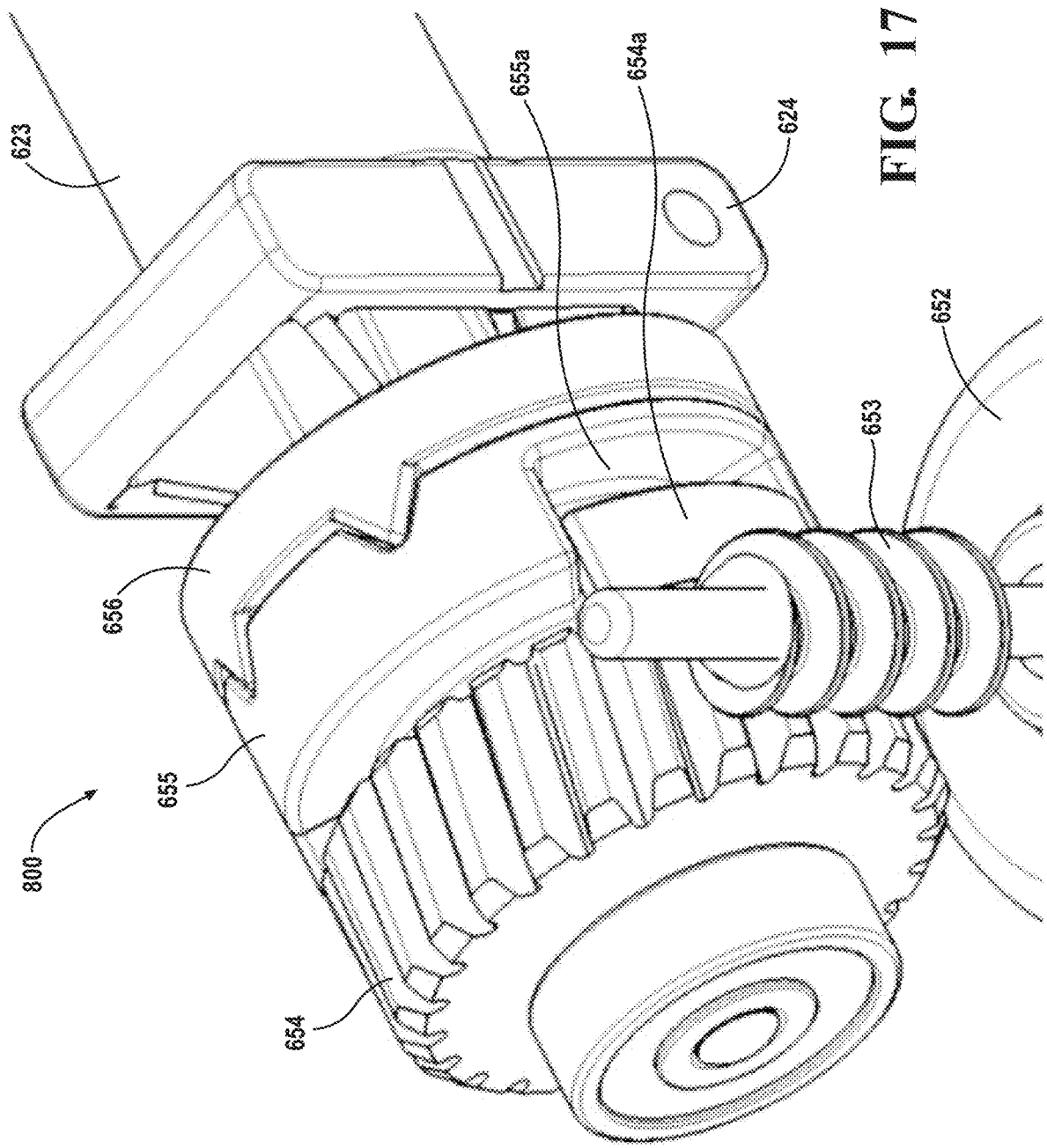
FIG. 17 is an enlarged perspective view of the clutch assembly showing an initial position.

FIGS. 17-21 illustrate a progression of the clutch assembly 800 from a condition prior to a slam force being received, and progressing as the slam force is received. In FIG. 17, an initial position of the coupling disk 656 and coupling lever 655 is shown. The coupling disk 656 and coupling lever 655 are engaged, and the clutch 800 is therefore engaged, and the coupling lever 655 is shifted axially away from the worm gear 654 due to the spring 657.

Figure 18:
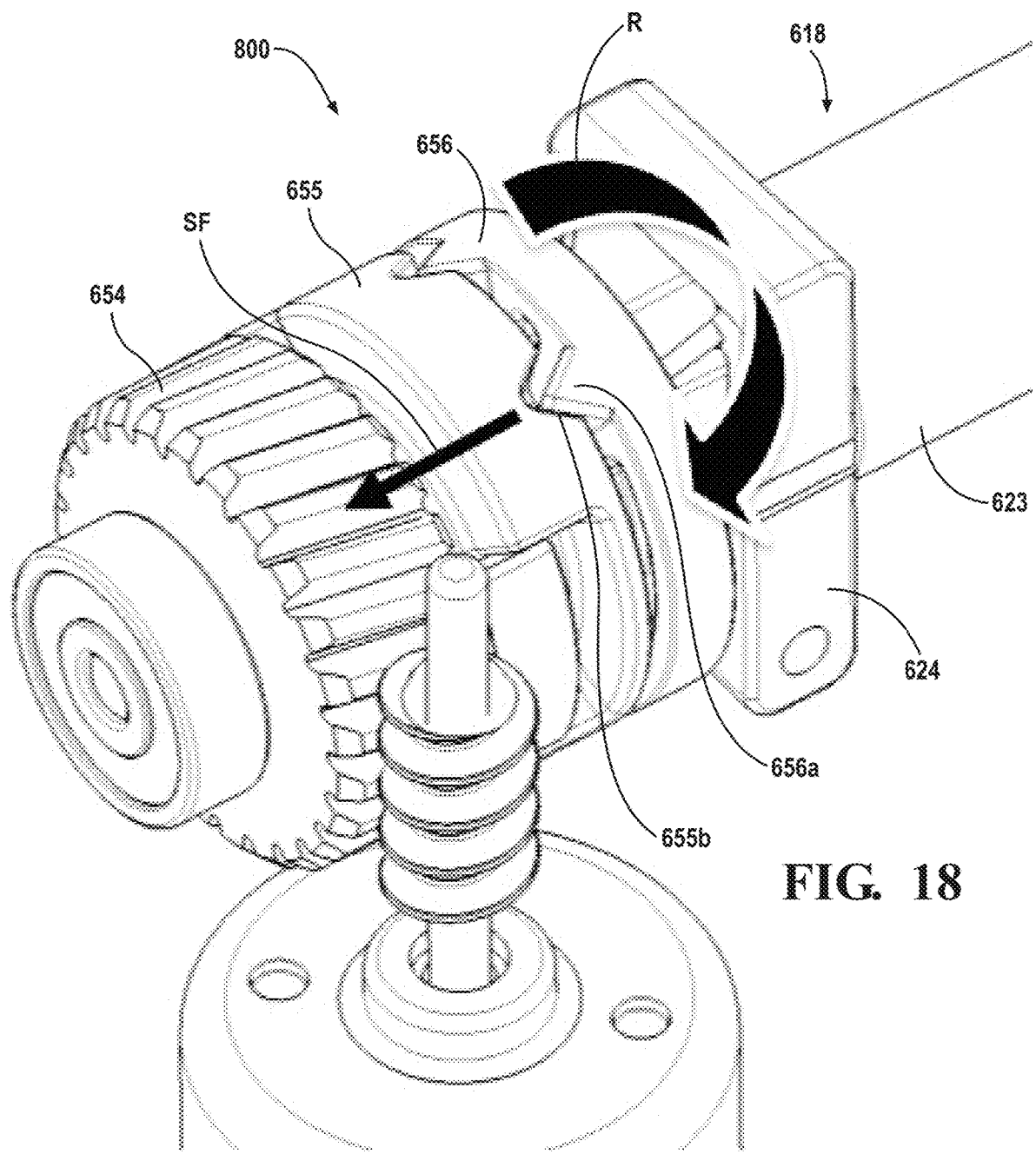
FIG. 18 is an enlarged perspective view of the clutch assembly in response to axial load exerted on the extensible member, with a tooth camming out of engagement with a notch.
Figure 19:
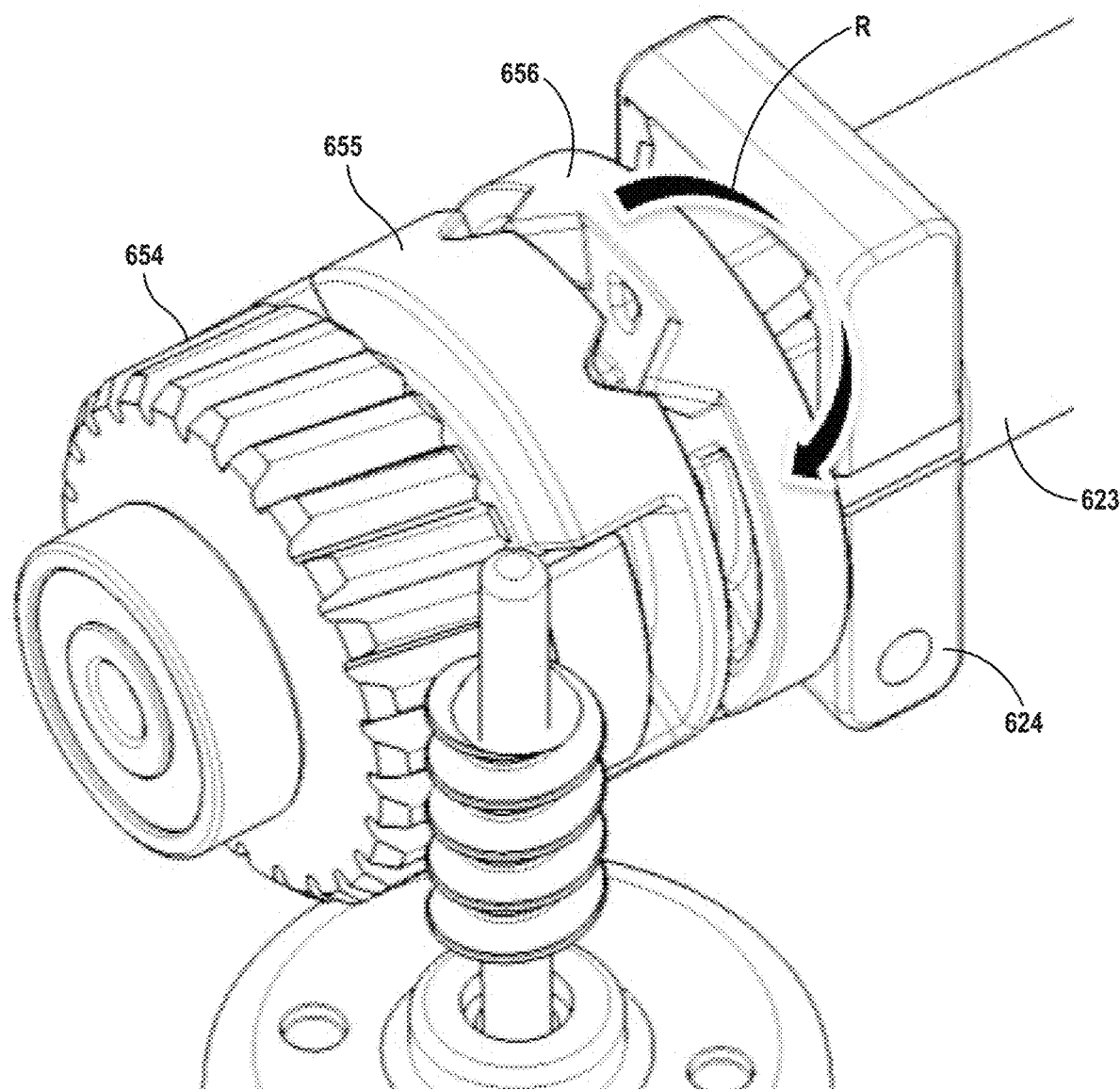
FIG. 19 is an enlarged perspective view of the clutch assembly illustrating further rotation and movement of the coupling disk relative to the coupling lever.

In FIG. 18, an initial slam force is received. The axial force on the extensible member 618 toward the clutch assembly 800 causes the coupling lever 655 to shift axially toward the worm gear 654 (in the direction of the arrow SF) against the bias of the spring 657, and the corresponding force of rotation on the lead screw 628 and coupling disk 656 (where the rotation R is caused by axial movement of the nut 624) causes the teeth 656a to begin sliding out of engagement from notches 655b. In FIG. 19, the coupling lever 655 is shown not in full abutting contact with the gear 654 (but in response to the slam force, the coupling lever 655 may shift axially to abut the worm gear 654), and the teeth 656a are almost disengaged from the notches 655b.

Figure 20:
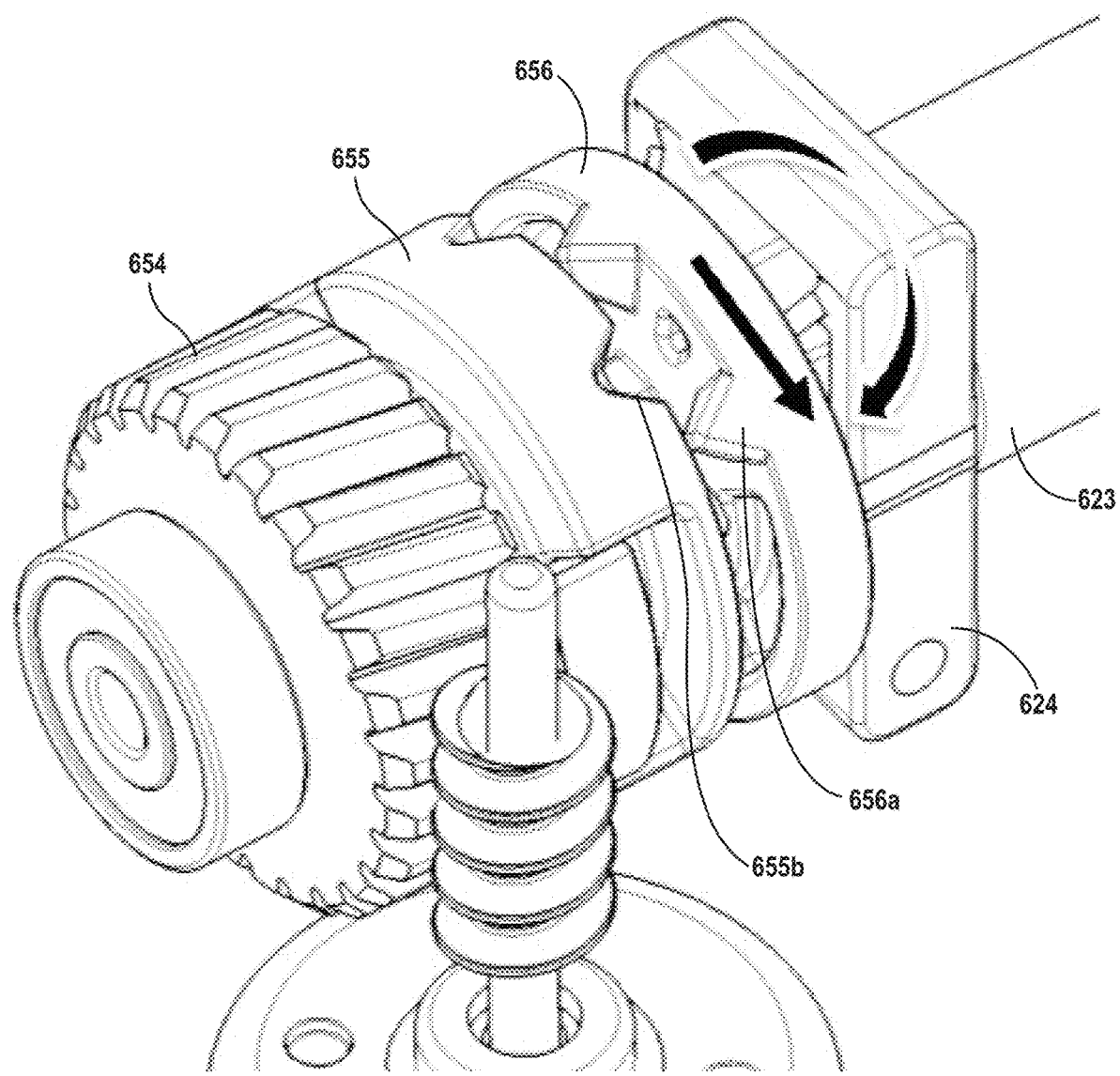
FIG. 20 is an enlarged perspective view of the clutch assembly illustrating a disengaged state with the coupling disk and lead screw rotating relative to the coupling lever.

In FIG. 20, the teeth 656a are disengaged from the notches 655b, and the teeth 656a rotate and slide along the axial face of the coupling lever 655 along with the rotation of the lead screw 628. The coupling lever 655 may still abut the worm gear 654, and the spring 657 continues to bias the coupling lever 655 toward the coupling disk 656, but the axial load (SF), where the axial load (SF) is illustratively caused by a slamming of the door 12 towards the vehicle body 14 on the lead screw 628 and coupling disk 656, may continue to overcome the force of the spring 657 (in this case, the coupling lever 655 may still abut the worm gear 654). While the lead screw 628 and coupling disk 656 rotate, the coupling lever 655 and worm gear 654 do not rotate, and therefore no rotational force is imparted on the spur gear 653 or the motor 652. In this state, the coupling disk 656 may continue to rotate, and the nut 624 is allowed to approach the coupling disk 656 as the lead screw 628 rotates. FIGS. 18-21 illustrate the nut 624 in a position adjacent the coupling disk 656. However, when in the extended position, the but 624 would be located away from the coupling disk 656. In response to the slam force, the nut 624 and tube 623 move toward the coupling disk 656, rotating the lead screw 628 and coupling disk 656 as they travel inward.

Figure 21:
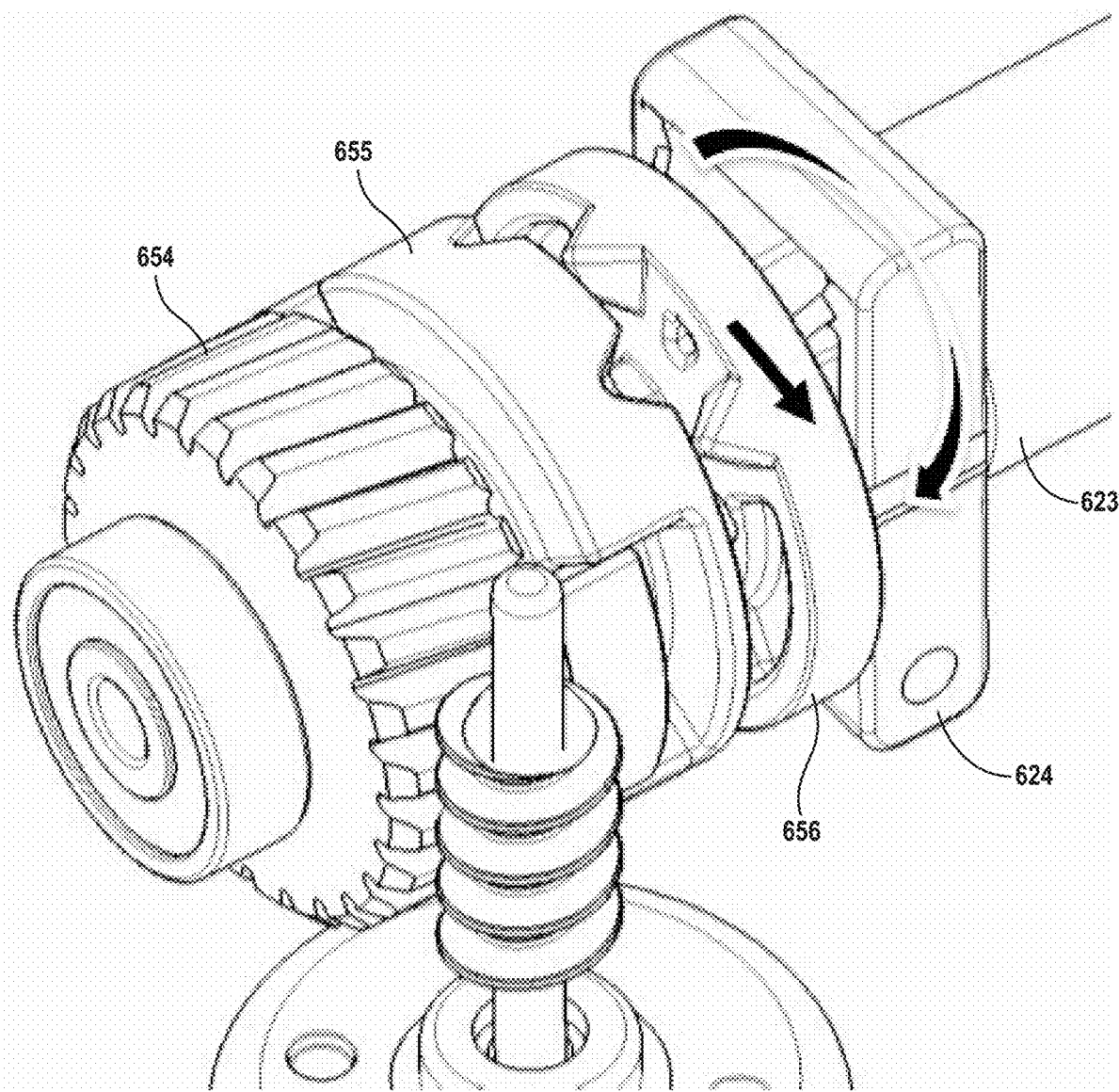
FIG. 21 is an enlarged perspective view of the clutch assembly illustrating further rotation.
Figures 22A, 22B, 22C, 22D:
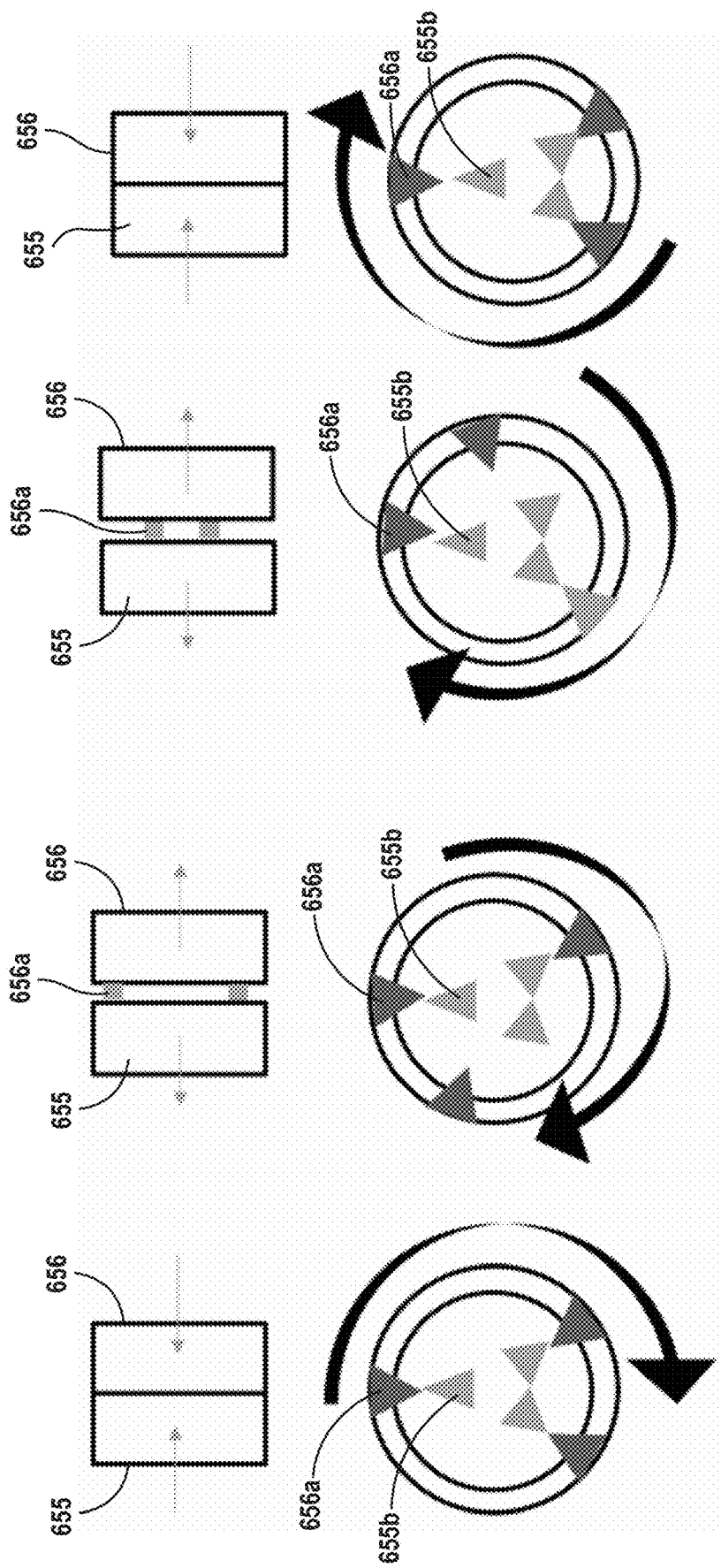
FIGS. 22A-22D illustrate a schematic operation of the clutch assembly, illustrating a progression from engagement between the coupling disk and coupling lever and the tooth-and-notch connection through continued rotation and re-engagement.

Continued rotation of the lead screw 628 and coupling disk 656, shown in FIG. 21, allows for continued axial translation of the nut 624 and extensible member 618, until the teeth 656a re-engage the notches 655b. Upon elimination of the slam load, for example with the door in a closed position and the extensible member 618 in the retracted position, the bias of the spring 657 will push the coupling lever 655 and coupling disk 656 together into the engaged position, resembling the initial state shown in FIG. 17.

When the clutch assembly 800 is in the initial or engaged position, the required amount of force to disengage the clutch assembly 800 may be referred to as a clutch engagement threshold. Accordingly, the clutch assembly 800 is disengaged in response to the extensible member 618 applying a force to the clutch assembly 800 exceeding the clutch engagement threshold.

The clutch assembly 800 may be re-engaged as described above, in response to rotation of the coupling disk 656 rotating a sufficient degree in response to the continued slam load and/or axial motion of the extensible member 618. However, the clutch 800 may also be re-engaged in response to actuating the motor 652. Accordingly, the clutch 800 may act as a failsafe when the door presenter 602 loses power or otherwise fails to retract the extensible member 618. However, in the event that not enough rotation of the coupling disk 656 occurs, actuating the motor 652 in response to a signal may thereafter re-engage the clutch 800 by causing rotation of the coupling lever 655 and the worm gear 654, and the notches 655b of the coupling disk 655 will eventually rotate into an angular orientation in which all of the teeth and notches are aligned to allow engagement.

In one aspect, the components of the door presenter 602 that are "downstream" of the clutch assembly 800 and that are actuated to move the extensible member 618 to the extended position may also be referred to as an actuator, actuation member, actuation portion, or actuated portion 629, and may include one or more of the lead screw 628, drive nut 624, the sleeve 623, the extensible member 618, the bumper 622, and/or any of other component that is actuated when the clutch assembly 800 is engaged and the motor 652 is actuated and the coupling disk 656 rotates along with the coupling lever 655.

Similarly, the motor 652 and the components that are rotated or otherwise actuated in response to actuating the motor 652 (the components "upstream" of the clutch assembly 800) may also be referred to as an actuator, actuator member, actuation portion, or actuating portion 631, and may include one or more of the worm gear 654, spur gear 653, the motor 652, and/or any other component that is actuated when the motor 652 is actuated and that causes, for example, the coupling lever 655 to rotate. Thus, the door presenter 602 may be described, in one aspect, as including clutch assembly 800 disposed between the motor 652 and an actuator, with the actuator in this case being the actuated portion 629, which may include for example the extensible member 618. The door presenter 602 may also be described, in one aspect, as including clutch assembly 800 disposed between an actuator and the extensible member 618, with the actuator in this case being the actuating portion 631, which may include for example the motor 652. Additionally, the door presenter 602 may generally be referred to as an actuator due to its actuation of the door to a presented position.

The above described clutch assembly 800 may be applied to any type of rotation-translation mechanism, and is not limited to the door presenter described herein. For example, the features of clutch assembly 800 may be applied to the power swing-door actuator 22 in a similar manner, or other types of power door presenter assemblies that may have different motor driving arrangements. In these aspects, the ultimate driven gear that is aligned with the corresponding lead screw that rotates to linearly drive a nut/extensible member can include a similar coupling lever and coupling disk with a toothed clutch that will disengage upon receipt of an axial and rotational load on the lead screw that overcomes the spring bias holding the coupling disk and coupling lever together. The toothed clutch 800 described herein may also be applied to other actuator types, and is not necessarily limited to door presenters.

Figure 23:
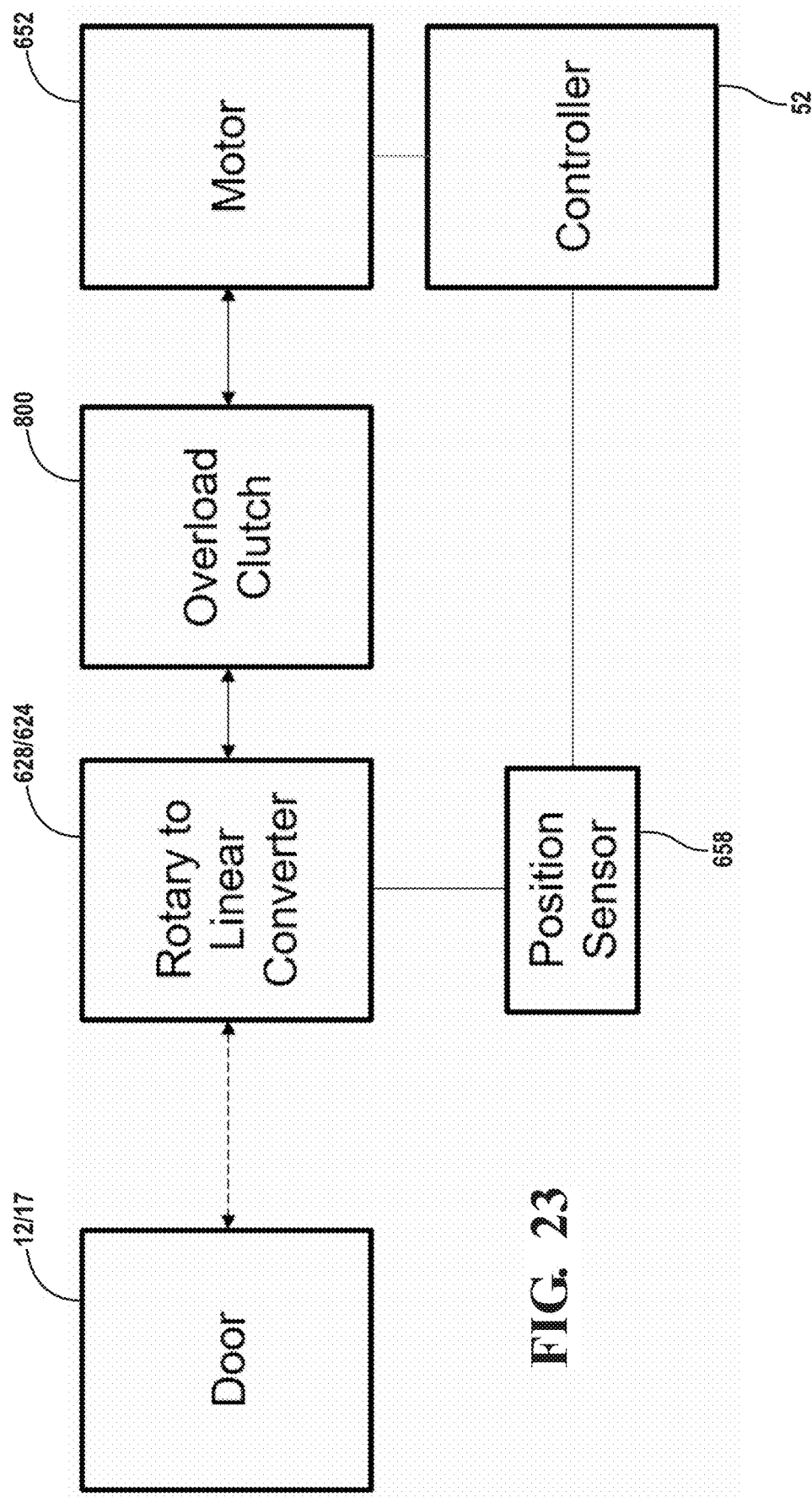
FIG. 23 illustrates a schematic diagram of a door system with a power door presenter and overload clutch assembly.

FIG. 23 illustrates a schematic view of an exemplary system in accordance with the above disclosure. The system includes the door 12/17, which is moveable, pivotable, or presentable in response to linear translation of a rotary to linear converter (such as the combination of the nut 624 and the lead screw 628). The rotary-linear converter is coupled to the overload clutch 800 described herein, which is coupled to a motor 652 via a gear, such as gears 653, 654. The rotary-linear converter may also be in communication with the position sensor 658 to determine a location or position of the nut 624 or extensible member 618. The position sensor 658 is in communication with a controller, such as ECU 52, which is in communication with the motor 652. Accordingly, the controller 52 may operate to signal to the motor 652 to operate and extend the nut 624 when the extensible member 618 is sensed as being in a retracted position, or to retract the extensible member 618 when the extensible member 618 is extended and the door 12, 17 has been opened. However, in the event of a control failure, the overload clutch 800 permits the door 12, 17 to be closed, which impacts the rotary-linear converter 624/628, which disengages the overload clutch 800 to avoid backdriving the gear 654, 653 and motor 652.

It will be appreciated that other rotary-linear converters could also be used. For example, an outer tube and/or nut may remain axially fixed and fixed to the coupling disk 656, such that a lead screw may be the component that translates axially in response to rotation of the coupling disk 656.

In one aspect of operation, upon receiving a present command, swing door ECU 52 can provide a signal to electric motor 652 in the form of a pulse width modulated voltage (for speed control) to turn on motor 652 and initiate pivotal opening movement of vehicle door 12 towards its partially open deployed position (i.e. presented position) (recognizing that primary latch assembly 13 is already in its unlatched state as further discussed below) via extension of extensible member 618. While providing the signal, swing door ECU 52 can also obtain feedback from s sensor 64 (which may be attached to a side mirror 65 in one example) to ensure that contact with an obstacle has not occurred or occurring as would be the case if an object or person is leaning upon the vehicle door 12 or otherwise that the user is present (e.g. is manually in charge of door 12). If no obstacle is present, motor 652 will continue to generate a rotational force to actuate spur gear 653 and worm gear 654 and thus extension of extensible member 618 until certain door positions are reached (e.g. 50 mm open position) or otherwise indicate that the user is present (e.g. hand is on the presented door 12 at the handle regions 69a and 69b for example). Once vehicle door 12 is positioned at the desired location, motor 652 is turned off. The user may then take control of door 12, or the vehicle door 12 can be automatically opened by swing door ECU 52 commanding power-operated swing door actuator 22. Otherwise, upon signaling of manual control of door 12 by the user, the extensible member 618 may be retracted by door ECU 52 actuating the motor 652 in the reverse direction.

In the case of a power failure, the extensible member 618 may be retracted by applying a slam force on the door 12, 17 to disengage the clutch assembly 800, as described above. Swing door ECU 52 may control both power-operated door presenter 602 and power-operated swing door actuator 22 in a coordinated manner. For example, swing door ECU 52 may control power-operated door presenter 602 over a first range of motion (e.g. from a fully closed to a presented position of the vehicle door 12), and then swing door ECU 52 may control power-operated swing door actuator 22 over a second range of motion during which power-operated door presenter 602 is not powered. In another example swing door ECU 52 may control both power-operated door presenter 602 and power-operated swing door actuator 22 over a first range of motion (e.g. from a fully closed to a presented position of the vehicle door 12) to provide for increased door moving force to overcome ice buildup, or to overcome the inherent high torque requirement for moving the door 12 from the closed position due to the small moment arm typically present for the power operated swing-door actuator 22.

As a result both the motor output, power requirements and therefore size of power-operated swing door actuator 22 and power-operated door presenter 602 may be reduced, as both will be operating in tandem, and in particular since power-operated door presenter 602 will be acting at leveraged position on vehicle door 12 away from the hinges 16, 18 thereby gaining mechanical advantage compared to the more closely coupled swing door actuator 22. The user may then take control of door 12, or the vehicle door 12 can be automatically opened by swing door ECU 52 commanding power-operated swing door actuator 22.

Method

Figure 24:
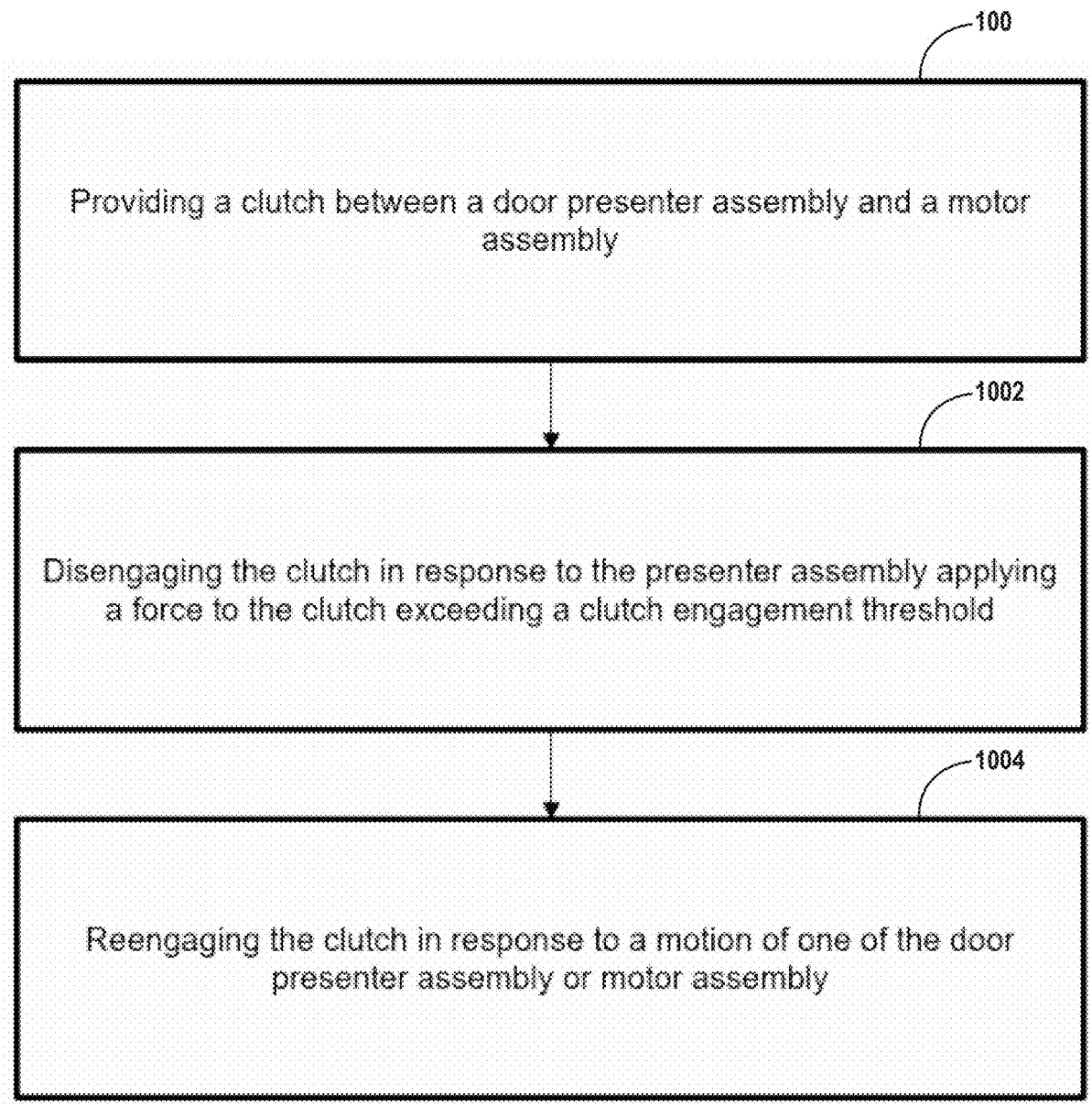
FIG. 24 illustrates a flow chart of a method of operating a power door presenter with an overload clutch.

An example operation of the embodiment of power door presenter system 70 to present the door 12, which could include only operation of the power-operated door presenter 602 having the overload clutch assembly 800 operating to allow the extensible member 618 to be retracted in the case of power failure, is shown in the flowchart of FIG. 24.

Specifically, at step 1000, the clutch assembly 800 is provided between the door presenter 602, in particular the extensible member 618, and the motor 652. As described above, the clutch assembly 800 may provide overload protection and allow the extensible member 618 to be forced inward toward the clutch assembly 800, which will disengage such that the lead screw 628 may rotate the coupling disk 656 without applying a force to the motor 652.

At step 1002, the clutch assembly 800 is disengaged in response to the presenter 602, in particular the extensible member 618, applying a force to the clutch assembly 800 that exceeds the clutch engagement threshold. For example, a force corresponding to a door slam load may exceed the threshold, while a force simply corresponding to the weight of the door 12, 17 may not disengage the clutch assembly 800.

At step 1004, the clutch assembly 800 is re-engaged in response to relative motion of the door presenter 602, in particular the continued translation of the extensible member 618 that causes continued rotation of the lead screw 628 and the coupling disk 656, relative to the motor 652. The motion may occur at the coupling disk 656 or at the coupling lever 655, or at both. Re-engagement will occur once the teeth 656a have rotated enough to be received in the corresponding pattern of the notches 655b.

It will be appreciated that various other steps may be included in the above described method in accordance with the operational capabilities described above. Similarly, the above-described method may be modified in accordance with the operational capabilities described above.

The power door presenter systems 70, 602 described herein thus demonstrates an arrangement for providing a door presenter functionality to move the door from its closed position to its partially-open deployed, or presented, position. The door may be subsequently grasped by a user to move the door from its deployed position to its fully-open position, either during a normal door opening request, an emergency crash situation, or a failure of the main vehicle power source. While not limited thereto, the power-operated door presenter 602 is capable of providing a range of swinging deployment of about 30-50 mm to meet current door system requirements. Moreover, as described herein, the power door presenter 602 may allow for retraction of the extensible member 618 in the event of a failure without damaging the motor due to the arrangement of the clutch assembly 800.

In another aspect, a method of operating the power presenter actuator 70 may include the steps of controlling a power-operated presenter actuator 70 mounted to one of a vehicle body 14 and the vehicle door 12, the power-operated presenter actuator 70 including an extensible member 618 being moveable between a retracted position and an extended position to abut (e.g. in non-permanent manner) with the other one of the vehicle body 14 and vehicle door 12 to move the vehicle door 12 from the fully closed position to a presented position, and controlling a powered swing door actuator 22 coupled (e.g. in a permanent manner) between the vehicle body 14 and the vehicle door 12 subsequent to the vehicle door 12 reaching the presented position to move the vehicle door 12 from the presented position to the fully-opened position. The method may also include the step of controlling the powered swing door actuator 22 during the controlling of the power-operated presenter actuator 70 to assist the power-operated presenter actuator 70 with moving the vehicle door 12 from the fully closed position to the presented position. The method may further include the step of controlling the power-operated presenter actuator 70 to move the extensible member 618 from the extended position to the retracted position in response to sensing the vehicle door 12 being moved to the presented position and a manual user having control of the vehicle door 12. The method may further include the step of controlling the primary latch assembly 13 mounted to the vehicle door 12 to release a primary striker 37 mounted to the vehicle body 14 when the vehicle door 12 is located in its closed position simultaneously to powered movement of the extensible member 618 causing movement of the vehicle door 12 from its closed position to its presented position. The method may further include the step of controlling the primary latch assembly 13 mounted to the vehicle door 12 to release a primary striker 37 mounted to the vehicle body 14 when the vehicle door 12 is located in its closed position subsequently to powered movement of the extensible member 618 causing movement of the vehicle door 12 from its closed position to its presented position. The method may further include the step of maintaining the extensible member 618 in its extended position during the vehicle door 12 being between the presented position and the fully-open position. The method may further include the step of retracting the extensible member 618 from its extended position to its retracted position in response to the vehicle door being sensed to be moving from its fully-opened position to the presented position.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door presenter with overload protection for pivoting a vehicle door relative to a vehicle body between a closed position and a partially open deployed position, the door presenter comprising:

an extensible member configured to act on one of the vehicle body and the vehicle door a lead screw coupled to the extensible member such that rotation of the lead screw causes translation along a linear axis of the extensible member relative to the lead screw, and an actuator for actuating movement of the extensible member between a retracted position corresponding to the closed position of the vehicle door and an extended position corresponding to the partially open deployed position of the vehicle door, wherein the actuator includes a motor operatively coupled to the lead screw, and wherein actuation of the motor causes rotation of a drive gear; and an overload clutch disposed between the extensible member and the actuator and including a coupling lever and a coupling disk that are biased toward engagement therebetween, wherein the coupling lever is rotationally fixed to the drive gear and is axially moveable relative to the drive gear, wherein the coupling disk is rotationally and axially fixed to the lead screw, the overload clutch having an engaged condition and a disengaged condition, wherein in the engaged condition actuation of the motor causes the drive gear to rotate the lead screw for moving the extensible member between the retracted position and the extended position, wherein in the disengaged condition, rotation of the lead screw is independent of rotation of the drive gear such that movement of the extensible member is independent of actuation of the actuator, and wherein the overload clutch shifts from the engaged position to the disengaged position in response to a predetermined axial load being exerted on the extensible member.

2. The door presenter of claim 1, wherein the overload clutch shifts from the disengaged condition to the engaged condition in response to a predetermined relative rotation between the drive gear and lead screw.

3. The door presenter of claim 2, wherein translation of the extensible member in response to the predetermined axial load causes rotation of the lead screw relative to the drive gear when the overload clutch is disengaged.

4. The door presenter of claim 1, wherein the overload clutch includes at least one tooth projecting from one of the coupling lever or the coupling disk, and wherein the at least one tooth is received in at least one notch defined in the other of the coupling lever or the coupling disk when the overload clutch is engaged, wherein the tooth is received in the notch at a predetermined angular orientation of the coupling lever relative to the coupling disk.

5. The door presenter of claim 4, wherein in response to the predetermined axial load, the coupling disk applies an axial load to the coupling lever and the coupling lever shifts relative to the drive gear, wherein a rotational load on the lead screw disengages the coupling disk from the coupling lever and disengages the overload clutch.

6. The door presenter of claim 5, wherein the at least one tooth cams out of engagement with a corresponding at least one notch to disengage the coupling disk from the coupling lever.

7. The door presenter of claim 1, wherein the overload clutch includes a spring disposed axially between the drive gear and the coupling lever, and wherein the spring biases the coupling lever toward the coupling disk.

8. An actuator comprising:

a lead screw coupled to a clutch assembly, wherein the clutch assembly has an engaged state and a disengaged state;

a motor operatively coupled to the clutch assembly and configured to rotate the clutch assembly when the clutch assembly is in the engaged state, wherein rotation of the clutch assembly in the engaged state rotates the lead screw; and a drive nut coupled to the lead screw, the drive nut being rotationally fixed, wherein rotation of the lead screw causes translation of the drive nut;

wherein a predetermined axial force on the drive nut toward the clutch assembly provides an axial and rotational force on the lead screw such that the clutch assembly is disengaged;

wherein rotation of the lead screw when the clutch assembly is disengaged decouples the motor from the lead screw such that the lead screw rotates freely relative to the motor;

wherein the clutch assembly includes a coupling disk rotationally and axially fixed to the lead screw and a coupling lever rotationally fixed to a drive gear coupled to the motor, wherein rotation of the lead screw in response to the predetermined axial force disengages the coupling disk from the coupling lever.

9. The actuator of claim 8, further comprising a spring disposed between the coupling lever and the drive gear, wherein the spring biases the coupling lever toward the coupling disk.

10. The actuator of claim 8, wherein the coupling disk and coupling lever are engaged via a tooth-and-notch connection having at least one tooth disposed within at least one notch.

11. The actuator of claim 10, wherein rotation of the lead screw in response to a predetermined axial load causes the at least one tooth to come out of engagement with the at least one notch.

12. The actuator of claim 8, wherein further rotation of the coupling disk relative to the coupling lever after the clutch is disengaged re-engages the clutch.

13. A method of operating an actuator with overload protection, the method comprising:

providing a clutch assembly between an actuator and a motor, wherein the clutch assembly includes a coupling disk and a coupling lever engaged via a tooth-and-notch connection having at least one tooth and at least one notch;

applying a predetermined axial load to the clutch assembly that exceeds a clutch engagement threshold;

disengaging the clutch assembly in response to applying the predetermined axial load;

rotating the coupling disk relative to the coupling lever in response to applying the predetermined axial load for camming the at least one tooth out of engagement with the at least one notch; and rotating a first portion of the clutch assembly relative to a second portion of the clutch assembly and, in response thereto, re-engaging the clutch assembly.

14. The method of claim 13, wherein the actuator includes a rotationally fixed nut threaded onto a rotatable lead screw, wherein the rotatable lead screw is rotationally fixed to the coupling disk, the method further comprising translating the nut toward the coupling disk and rotating the lead screw and the coupling disk in response.

* * * * *